(12) United States Patent
Sung et al.

(10) Patent No.: US 11,080,015 B2
(45) Date of Patent: Aug. 3, 2021

(54) COMPONENT LIBRARIES FOR VOICE INTERACTION SERVICES

(71) Applicant: Google LLC, Mountain View, CA (US)

(72) Inventors: Sang Soo Sung, Palo Alto, CA (US); Lantian Zheng, San Jose, CA (US); Haywai Hayward Chan, Sunnyvale, CA (US); Chen Liu, Mountain View, CA (US); Liuyi Sun, San Jose, CA (US); David P. Whipp, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/384,205

(22) Filed: Apr. 15, 2019

(65) Prior Publication Data

US 2019/0310824 A1 Oct. 10, 2019

Related U.S. Application Data

(63) Continuation of application No. 15/226,046, filed on Aug. 2, 2016, now Pat. No. 10,261,752.

(51) Int. Cl.
*G06F 3/16* (2006.01)
*G06F 3/0481* (2013.01)
(Continued)

(52) U.S. Cl.
CPC .......... *G06F 3/167* (2013.01); *G06F 3/04817* (2013.01); *G06F 3/04842* (2013.01);
(Continued)

(58) Field of Classification Search
CPC .. G06F 3/167; G06F 3/04817; G06F 3/04842; G10L 15/1815; G10L 15/1822;
(Continued)

(56) References Cited

U.S. PATENT DOCUMENTS 6,233,559 B1 5/2001 Balakrishnan
8,560,324 B2 10/2013 Shin
(Continued)

FOREIGN PATENT DOCUMENTS

EP 2980694 2/2016

OTHER PUBLICATIONS

'www.techcrunch.com' [online] "With a Voice Interface API for any App, wit.ai wants to be the twilio for natural language," Mar. 17, 2017, [retrieved on Oct. 11, 2017] Retrieved from Internet: URL< https://techcrunch.com/2014/03/17/with-a-voice-interface-api-for-any-app-wit-ai-wants-to-be-the-twilio-for-natural-language/> 9 pages.
(Continued)

*Primary Examiner* — Dino Kujundzic
(74) *Attorney, Agent, or Firm* — Middleton Reutlinger

(57) ABSTRACT

The disclosed embodiments include computerized methods, systems, and devices, including computer programs encoded on a computer storage medium, for integrating voice-based interaction and control into a native graphical user interface (GUI) of an executed application. For example, a communications device may obtaining component data identifying a plurality of components of a voice-user interface from a computing system maintained by a voice-service provider, and may execute an application linked to a corresponding one of the components of the voice-user interface. The communications device may generate the native GUI based on an output of the executed application, and may generate an interface element representative of the corresponding one of the components of the voice-user interface. The communications device may present the generated interface element within the native GUI, which may embed the corresponding component of the voice-user interface into the native GUI.

20 Claims, 9 Drawing Sheets

(51) Int. Cl.
  *G06F 3/0484* (2013.01)
  *G10L 15/18* (2013.01)
  *G10L 15/22* (2006.01)

(52) U.S. Cl.
  CPC ...... *G10L 15/1815* (2013.01); *G10L 15/1822* (2013.01); *G10L 15/22* (2013.01); *G10L 2015/223* (2013.01); *G10L 2015/225* (2013.01)

(58) Field of Classification Search
  CPC ............... G10L 15/22; G10L 2015/223; G10L 2015/225
  See application file for complete search history.

(56) References Cited

U.S. PATENT DOCUMENTS

| | | | |
|---|---|---|---|
| 8,595,642 | B1 | 11/2013 | Lagassey |
| 8,868,409 | B1* | 10/2014 | Mengibar ............... G06F 40/30 704/9 |
| 9,837,081 | B2 | 12/2017 | Kannan |
| 10,796,085 | B2* | 10/2020 | Daoud ................. G06F 40/154 |
| 2004/0230637 | A1 | 11/2004 | Lecoueche |
| 2006/0136220 | A1 | 6/2006 | Gurram et al. |
| 2006/0136221 | A1 | 6/2006 | James |
| 2007/0168953 | A1* | 7/2007 | Diez .................. G06F 9/45537 717/118 |
| 2008/0144603 | A1 | 6/2008 | Chouksey |
| 2008/0144604 | A1 | 6/2008 | Sharma |
| 2008/0255852 | A1 | 10/2008 | Hu |
| 2010/0324910 | A1 | 12/2010 | Chambers |
| 2013/0275875 | A1 | 10/2013 | Gruber |
| 2014/0040748 | A1* | 2/2014 | Lemay ................ G10L 15/1822 715/728 |
| 2014/0207452 | A1* | 7/2014 | Klein .................... G06F 3/0304 704/235 |
| 2014/0218372 | A1 | 8/2014 | Missig |
| 2014/0282045 | A1 | 9/2014 | Ayanann |
| 2015/0019623 | A1* | 1/2015 | Garg ....................... H04L 47/70 709/203 |
| 2015/0040012 | A1 | 2/2015 | Faaborg et al. |
| 2016/0034253 | A1 | 2/2016 | Bang |
| 2016/0077793 | A1 | 3/2016 | Disano |
| 2016/0132290 | A1 | 5/2016 | Raux |
| 2016/0171980 | A1* | 6/2016 | Liddell .................. G06F 3/167 704/275 |
| 2016/0231870 | A1* | 8/2016 | Summa .................. G06F 9/542 |
| 2017/0358305 | A1 | 12/2017 | Kudurshian |

OTHER PUBLICATIONS

International Search Report and Written Opinion issued in international Application No. PCT/US2017/043491, dated Oct. 24, 2017, 15 pages.
PCT Written Opinion issued in International Application No. PCT/US2017/043491, dated Jul. 2, 2018, 7 pages.
European Patent Office; Communication Pursuant Article 34(3) EPC; issued in Application No. 17746615.8; 6 pages; dated Jul. 21, 2020.

* cited by examiner

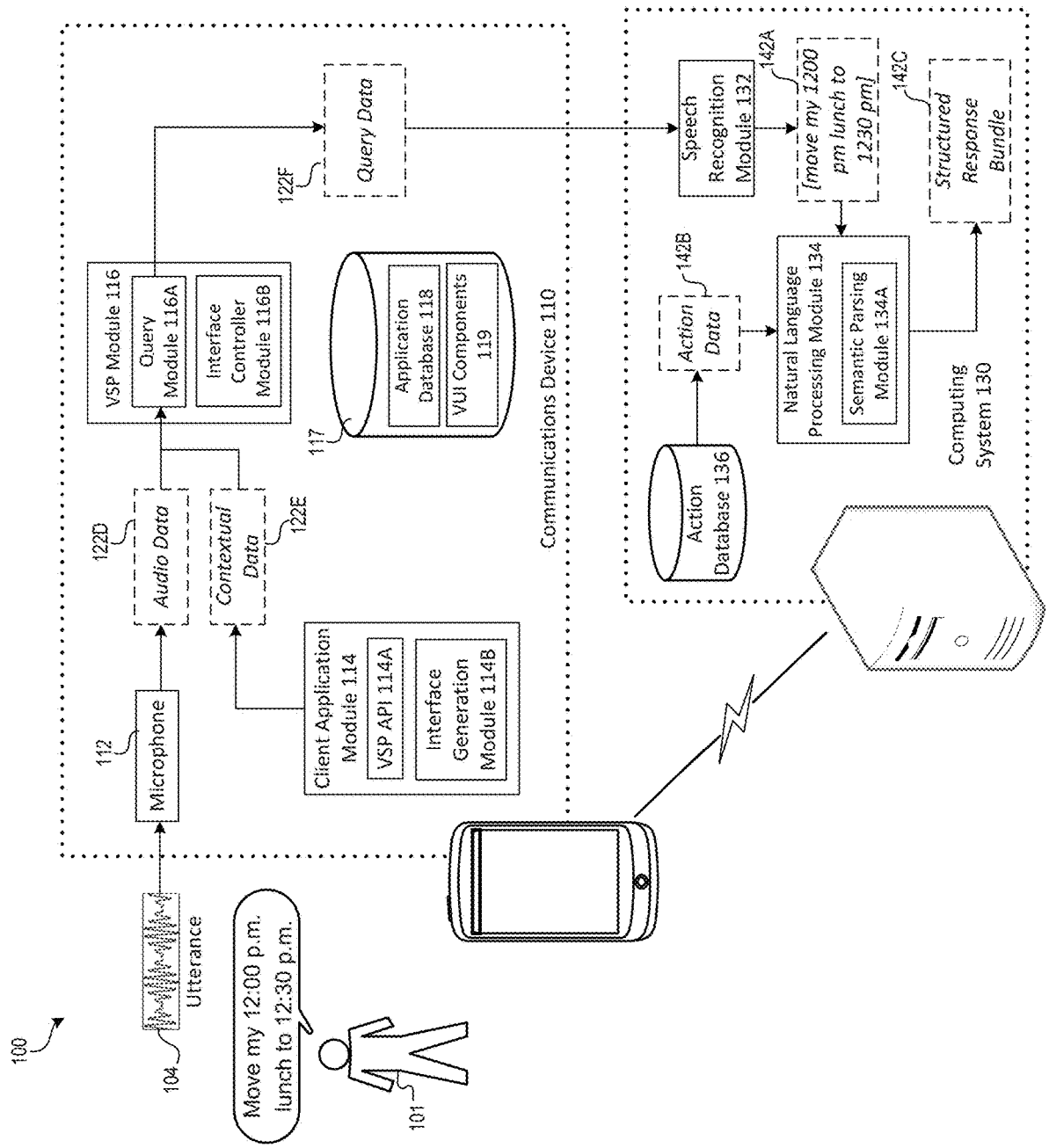

COMPONENT LIBRARIES FOR VOICE INTERACTION SERVICES

CROSS-REFERENCE TO RELATED APPLICATIONS

This application is a continuation of and claims priority to U.S. application Ser. No. 15/226,046, filed on Aug. 2, 2016, the entire contents of which are hereby incorporated by reference.

FIELD

This specification describes technologies related to voice interaction services for executable applications.

BACKGROUND

Now, more than ever, voice-based input represents a fundamental mechanism for individuals to interact with computing devices, and in particular, to interact with various applications executed by mobile devices, such as smart phones and wearable computing devices.

SUMMARY

This specification relates to computerized processes that integrate voice-based interaction and control into native graphical user interfaces (GUIs) generated by executable applications. For example, in certain implementations, one or more components of a voice-user interface (VUI) may be embedded into and presented within the native GUI generated by an executable application, and when selected by a user, the VUI components may enable that user to provide voice input relevant to an operation or functionality of the executed application. Further, these embedded VUI components may enable the executed client application to access speech-recognition, natural-language processing, and semantic-parsing functionalities that determine a content and an application-specific meaning of the voice input, which may be translated into structured data representing a command instructing the executable application to perform operations consistent with the determined application-specific intent.

For example, a cloud-based computing system maintained by a voice-service provider (VSP) may establish and maintain a library of VUI components, such as microphone icons, speaker icons, help card interfaces that identify words and phrases commonly uttered during voice-based interaction with various applications, text view interfaces that present textual content representative of spoken utterances upon recognition, and informational or navigational cards that, when presented within corresponding view containers, present responses to one or more uttered generic inquiries. In some instances, the computing system identify one or more of the VUI components that are consistent with characteristics of a communications device, such as a smart phone, and the computing system may provide a package of the identified VUI components to a communications device across an appropriate communications network. The package of identified VUI components may, for example, include statically or dynamically linked libraries of VUI components, which may be provided to the communications device through an appropriate programmatic interface, such as an application programming interface associated with the computing system.

The communications device may receive the package of the identified VUI components, e.g., as component data, and may store the received component data in a portion of a structured data repository. Further, in some aspects, the communications device may execute a particular application, such as a calendar application, linked to at least a portion of the received component data. Based on an outcome of the executed application, the communications device may generate data indicative of a native graphical user interface (GUI) associated with the application and further, may generate interface elements corresponding to one or more of the VUI components that are associated with the linked component data. The communications device may present the native GUI and the generated interface elements to a user through a corresponding display unit, such as a touchscreen display. In some instances, by presenting the interface elements within the native GUI, the communications device may embed the one or more VUI components into the native GUI, and facilitate the user's voice-based interaction with the executed application.

For example, the embedded VUI component may include an icon representative of a microphone, and the user may provide touch-based input that selects the microphone icon, which may cause a voice-service provider (VSP) application, such as a digital assistant application, to activate a microphone and configure that microphone to capture utterances spoken by the user. The VSP application may generate audio data that includes the captured utterance, may obtain contextual data indicative of the user's current interaction with the calendar application, and may generate contextual query data that includes portions of the generated audio data and the obtained contextual data. The VSP application may, in some instances, transmit the contextual query data to the computer system maintained by the voice-service provider, which may apply one or more of a speech recognition algorithm, a natural-language processing algorithm, and a semantic parsing algorithm to portions of the contextual query data. Based on the application of these algorithms and techniques, the cloud-based system may determine a content of the spoken utterance and further, an application-specific meaning expressed within the utterance. The cloud-based system may also determine one or more actions that may be performed by the calendar application, and that are consistent with the user's application-specific intention.

In certain instances, the computer system may generate a structured response bundle that includes the one or more determined actions, and that may be formatted in accordance with a corresponding command format that causes the calendar application to perform the one or more determined actions. The computer system may transmit the structured response bundle to the communications device, and the VSP application may provide portions of the structured response bundle to the calendar application through a programmatic interface. In response to the structured response bundle, the calendar application may perform one or more operations consistent with the user's application specific intent, and the communications device may update or modify portions of the native GUI in response to an output of these performed operations.

In one implementation, a computer-implemented method may include obtaining, by one or more processors, component data identifying a plurality of components of a voice-user interface, and executing an application using the one or more processors. The application may be linked to a corresponding one of the components of the voice-user interface. The method may also generate, by the one or more processors, a native graphical user interface based on an output of the executed application. The native graphical user interface may include first interface elements, and the first interface elements may include content associated with the executed application. Further, the method may generate, by the one or more processors, a second interface element representative of the corresponding one of the components of the voice-user interface, and present, by the one or more processors, the native graphical user interface and the second interface element through a display unit of a communications device. The presented second interface element may embed the corresponding component of the voice-user interface into the native graphical user interface.

In some aspects, the step of generating the second interface element may include generating layout data specifying a position of the corresponding component of the voice-user interface within the native graphical user interface, and the step of presenting the native graphical user interface may include presenting the second interface element within the native graphical user interface at the specified position. In other aspects, the step of obtaining may include receiving a least a portion of the component data from a computing system associated with a voice-service provider. The step of receiving may, in certain instances, receive the portion of the component data through a programmatic interface established by the computing system associated with the voice-service provider. In additional aspects, the component data may include at least one of a dynamically linked library or a statically linked library, and the method may also include establishing the link between the executed application and a portion of the dynamically linked library or a statically linked library associated with the corresponding component of the voice-user interface.

Additionally, the communications device may include a microphone and the second interface element may include an icon associated with the microphone. The method may also include detecting an operational status of the microphone, and modifying a visual characteristic of the icon to reflect the detected operational status, the modification being visually perceptible by a user. In some aspects, the method may also include receiving user input indicative of a selection of the icon, and performing operations that activate the microphone in response to the received user input. The step of modifying may include modifying the visual characteristics of the icon to reflect the activation of the microphone.

In certain aspects, the method may include: receiving audio data corresponding to a first utterance spoken by a user into a microphone of the communications device, the first utterance being associated with a functionality of the executed application; obtaining structured data representative of the received audio data, the structured data causing the executed application to perform one or more operations consistent with the associated functionality; and providing the structured data to the executed application through a programmatic interface, the executed application performing the one or more operations in accordance with the structured data. Additionally, the method may include identifying linguistic elements that represent the first utterance based on an application of at least one speech recognition algorithm to the received audio data, and presenting portions of the identified linguistic elements within the second interface element. The presented second interface element may, for example, include a textual representation of at least one of a command or a query associated with the executed application, the textual representation prompting the user to speak the utterance.

In further instances, the method may include receiving additional audio data corresponding to a second utterance spoken by the user into the microphone. The second utterance may specify a generic query, and the second interface element may include at least one of a textual or graphical representation of a response to the generic query. Additionally, the step of presenting may include presenting the at least one textual or graphical representation of the response within a view container associated with the second interface element. The second interface element may, for example, include at least one of an overlay interface element, a slide-up interface element, a slide-down interface element, or a drawer interface element.

In other implementations, corresponding systems, devices, and computer programs, may be configured to perform the actions of the methods, encoded on computer storage devices. A device having one or more processors may be so configured by virtue of software, firmware, hardware, or a combination of them installed on the device that in operation cause the device to perform the actions. One or more computer programs can be so configured by virtue of having instructions that, when executed by device, cause the device to perform the actions.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 1A-1D and 2 are diagrams of exemplary computing systems.

Like reference numbers and designations in the various drawings indicate like elements.

DETAILED DESCRIPTION

Figure 1A:
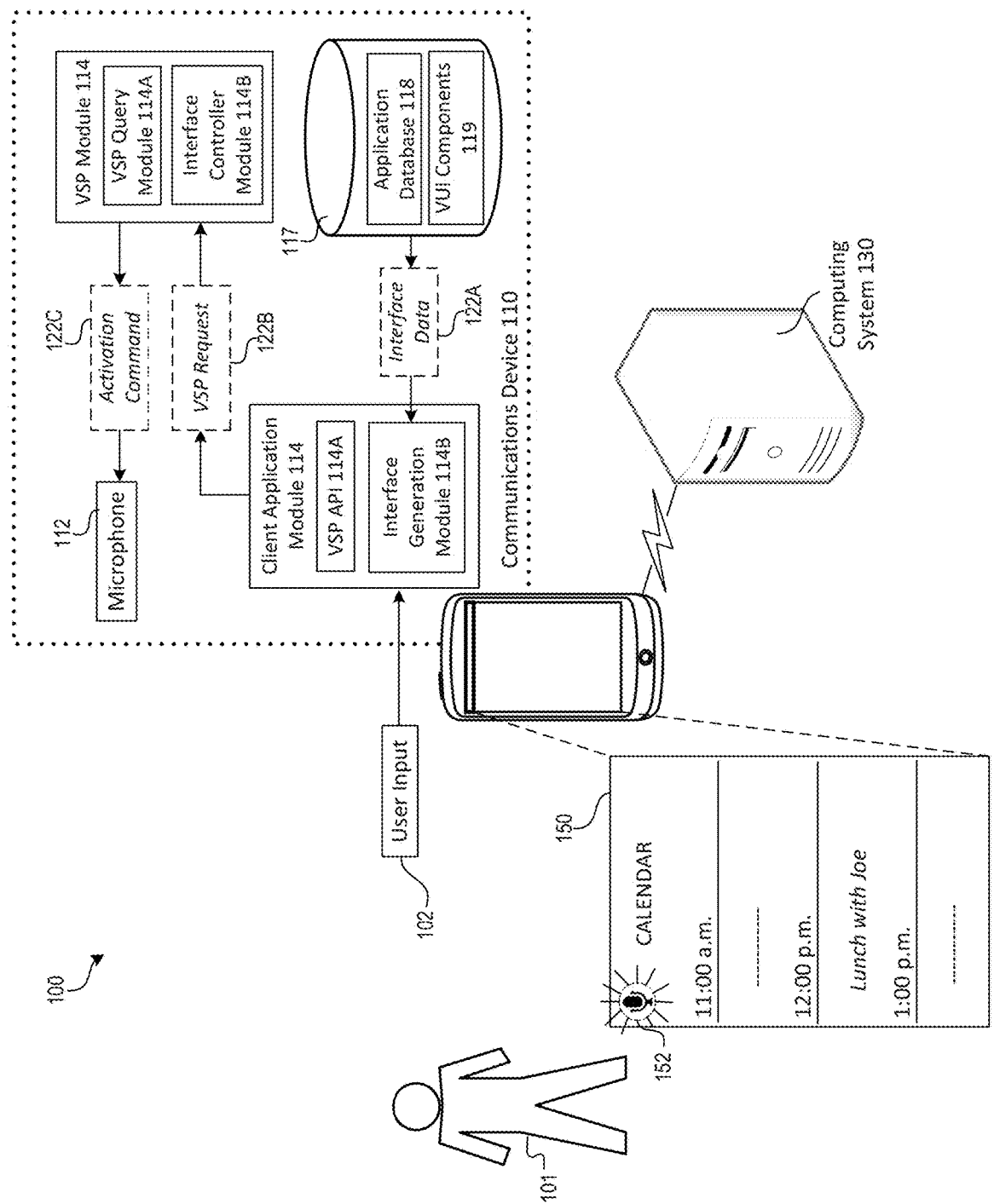

FIGS. 1A, 1B, 1C, and 1D are diagrams of an exemplary system 100 that integrates a functionality of a voice-service provider (VSP) into an executable application to facilitate voice interaction and control, in accordance with certain exemplary implementations. In some aspects, system 100 may include a communications device 110, such as a user's smartphone or tablet computer, and a computing system 130, which may represent a cloud-based or other back-end system associated with and/or maintained by the voice-service provider. Additionally, although not shown in FIGS. 1A, 1B, 1C, and 1D, system 100 may also include a communications network that interconnects various components of system 100, such as communication device 110 and computing system 130. For example, the communications network may include, but is not limited to, a wireless local area network (LAN), e.g., a "WiFi" network, a RF network, a Near Field Communication (NFC) network, a wireless Metropolitan Area Network (MAN) connecting multiple wireless LANs, and a wide area network (WAN), e.g., the Internet.

In some aspects, communications device 110 may store and execute various client application programs, such as calendar applications, web browsers, social-media applications, and digital and streaming music players. For example, communications device 110 may execute a calendar application, and may perform operations that generate content for presentation within a corresponding native graphical user interface (GUI), e.g., through a display unit of communications device 110 (not depicted in FIGS. 1A, 1B, and 1C). For example, the display unit may include a pressure-sensitive, touchscreen display, and a user 101 may provide touch-based input to the presented GUI to initiate a voice-based interaction with and control of one or more functions of the calendar application, such as processes that establish a new appointment, cancel an existing appointment, or search for an upcoming appointment on a particular day.

Additionally, communications device 110 may also store and execute various application programs provided by the voice-service provider, such as a digital-assistant application that, when executed by communications device 110, provides a voice-based digital assistant service to user 101. For example, the executed digital-assistant application may capture, as input, audio data corresponding to utterances spoken by user 101 into a microphone or other audio interface of communications device 110. The digital-assistant application may, in some aspects, apply one or more adaptive, speech-recognition algorithms to the captured audio data to determine linguistic elements that represent the utterances and further, may apply one or more natural language processing and semantic parsing algorithms to the linguistic elements to establish and meaning associated with the linguistic elements. The digital-assistant application may also provide data indicative of the determined content and/or meaning to one or more available web services, e.g., through a programmatic interface, which may perform operations consistent with the determined content and/or meaning.

In certain implementations, as described below, system 100 provides an adaptable and customizable framework that leverages the functionality of the digital-assistant applications described above to integrate voice-based interaction and control into a native GUI of an executed client application. For example, one or more components of system 100 such as computing system 130, may provide communications device 110 with a library or "toolkit" of interface elements associated with components of a voice-user interface (VUI). When incorporated into and presented within the native GUI of the executed client application, these VUI components may enable user 101 to provide voice input relevant to an operation or functionality of the executed application, and further, may enable the executed client application to access the speech-recognition, natural-language processing, and semantic-parsing functionalities of the digital assistant applications described above, which may determine a content and/or meaning of the application-specific voice input provided by user 101. In some aspects, the adaptable and customizable framework provided by system 100 may voice-enable one or more tasks within the native GUI of the executed client application, and may facilitate a seamless transition between voice-based and touch-based interaction with the native GUI, even in mid-task.

Referring back to FIG. 1A, communications device 110 may execute a client application, such as a calendar application, and a client application module 114 may generate a native graphical user interface (GUI) 150 for the calendar application. For example, an interface generation module 114B of client application module 114 may access data repository 117, and may obtain data, e.g., interface data 122A, from application database 118 that identifies one or more interface elements associated the executed calendar application. Interface generation module 1146 may generate native GUI 150 based on portions of interface data 122A, and a display unit of communications device 110 (not depicted in FIG. 1A) may present generated native GUI 150 to user 101, e.g., through a pressure-sensitive, touchscreen. For example, as illustrated in FIG. 1A, GUI 150 may include interface elements that indicate a scheduled "Lunch with Joe" at 12:00 p.m., but no scheduled appointments at 11:00 a.m. or 1:00 p.m. In some instances, user 101 may provide touch-based input to communications device 110 to access the various functionalities of the executed calendar application, as described above.

In additional implementations, client application module 114 may include, within native GUI 150, one or more interface elements associated with corresponding components of a voice-user interface (VUI), which may integrate voice-based interaction and control into native GUI 150. For example, and as described above, computing system 130 may provide data identifying one or more of the VUI components to communications device 110, which may store portions of the provided data within a portion of data repository 117, e.g., as VUI component data 119. In some aspects, computing system 130 may provide a portion of VUI component data 119 through a corresponding programmatic interface, such as VSP application programming interface (API) 114A. In other aspects, computing system 130 may provide a portion of VUI component data 119 in additional or alternate formats, e.g., as statically or dynamically linked library data, through VSP API 114A or through other channels of communications across any of the networks described above.

In certain aspects, VUI component data 119 may identify specific VUI components that are compatible with communications device 110 and additionally or alternatively, with the application programs executed by communications device 110, including the executed calendar application. For example, communications device 110 may include an audio interface, such as microphone 112, and VUI component data 119 may include data specifying an interface element corresponding to microphone 112, such as a graphical icon representative of the microphone and having a predetermined shape and/or dimension. In some aspects, interface generation module 114B may access VUI component data 119, and may obtain, as part of interface data 122A, additional data specifying the interface element corresponding to microphone 112, which may be presented within a portion of native GUI 150.

For example, as illustrated in FIG. 1A, native GUI 150 of the executed calendar application may include a microphone icon 152. In some aspects, user 110 may express an intention to initiate voice-based interaction with the calendar application by providing input 102 to communications device 110 that selects microphone icon 152, e.g., by touching or tapping a portion of a surface of the touchscreen display corresponding to microphone icon 152 with a finger or stylus. In response to a detection of user input 102, client application module 114 may generate a request to initiate a voice-interaction session, which client application module 114 may provide to a voice-service provider (VSP) application module 114 through an appropriate programmatic interface. For example, client application module 114 may transmit the request, e.g., VSP request 122B, to VSP module 116 through VSP API 114A, as described above.

VSP module 116 may receive VSP request 122B, and an interface controller module 114B may generate and transmit an activation command 122C to microphone 112. In some instances, activation command 122C may modify and operation state of microphone 112 from an "inactive" state to an "active" state, which may enable microphone 112 to detect and capture utterances spoken by user 101, as described below. Additionally, and in certain aspects, client application module 114 may detect the change in the operational state of microphone 112, e.g., from the inactive to the active state, and interface generation module 114b may modify one or more visual characteristics of microphone icon 152 to reflect the active state of microphone 112. For example, interface generation module 114B may modify a color of microphone icon 152 (e.g., changing the color of microphone icon 152 from red to green), modify a brightness of microphone icon 152, cause microphone icon 152 to flash with a predetermined frequency, or implement any additional or alternate visually perceptible modification to the visual characteristics of microphone icon 152 to reflect the active state of microphone 112.

In certain implementations, and upon activation of microphone 112, user 101 may speak one or more free-form utterances related to a function or an operation of the calendar application. For example, user 101 may utter an inquiry regarding a status of a scheduled appointment, such as a request for a time, location, or an attendee of the scheduled appointment (e.g., "Where am I meeting Joe for lunch at 12:00 p.m.?"). In other instances, user 101 may utter a request to change one or more parameters of the scheduled appointment, such as an appointment location (e.g., "Move the lunch with Joe from Del Frisco's to Mastro's.") and/or an appointment time (e.g., "Move the lunch with Joe to 12:30 p.m."). Additionally, user 101 may utter a command to schedule a new appointment, e.g., "Schedule a call with Josh at 1:30 p.m." The disclosed implementations are not limited to these exemplary utterances, inquiries, and commands, and in other implementations, user 101 may utter any additional or alternative statement related to function or operation of the calendar application.

In other aspects, user 101 may speak one or more utterances in response to a graphical or textual prompt presented to user 101 through an additional interface element disposed within native GUI 150. For example, interface generation module 114B may obtain an additional VUI component, e.g., from VUI component data 119, that identifies inquiries or commands commonly spoken by users of the calendar application. Interface generation module 114b may present an interface element representative of the additional VUI component within a portion of native GUI 150, and the commonly spoken inquiries or command may serve a prompt to user 101 when providing the one or more spoken utterances to microphone 112.

Referring to FIG. 1B, user 101 may speak an utterance 104 requesting that the scheduled 12:00 p.m. appointment be moved forward to 12:30 p.m. (e.g., "Move my 12:00 p.m. lunch to 12:30 p.m."). Microphone 112 may capture utterance 104, and may generate audio data 122D representative of the captured utterance, e.g., the spoken request to move the scheduled 12:00 p.m. meeting to 12:30 p.m. In some aspects, microphone 112 may provide audio data 122D as an input to VSP module 116. VSP module 116 may perform operations that implement a voice-based digital assistant on communications device 110, and as described below, VSP module 116, acting alone or in combination with computing system 130, may establish a content and meaning of spoken utterance 104 based on an application of one or more of a speech-recognition algorithm, a natural-language processing algorithm, and a semantic parsing algorithm to audio data 122D.

Additionally, in some aspects, an accuracy of the applied speech-recognition, natural-language processing, and/or semantic processing algorithms may be improved through an analysis of contextual data that describes an interaction of user 101 with the calendar application. For example, and based on an application of one or more speech recognition algorithms to audio data 122D, VSP module 116 and/or computing system 130 may identify linguistic elements (e.g., words, phrases, etc.) that represent spoken utterance 104. Due to variations in volume or quality of spoken utterance 104, or due to a presence of background noise in audio data 122D, an uncertainty may exist among the identified linguistic elements, and multiple combinations of linguistic elements may represent a single portion of spoken utterance 104. To mitigate the uncertainty among the identified linguistic elements, VSP module 116 and/or computing system 130 may apply the one or more speech recognition algorithms to audio data 122D in conjunction with contextual data that characterizes a current or prior interaction of user 101 with the calendar application. In certain aspects, by processing the contextual data, an outcome of the one or more applied speech recognition algorithms may be biased toward linguistic elements that are consistent with the calendar application and the current interaction of user 101 with that calendar application.

Referring back to FIG. 1B, VSP module 116 may obtain contextual data 122E from client application module 116. Contextual data 122E may, for example, include data that identifies the calendar application (e.g., a foreground application current accessed by user 101) and a version or a particular release of the calendar application. In further instances, contextual data 122E may also include data that characterizes content currently viewed by user 101 within native GUI 150 of the calendar application, such a type of calendar view presented within native GUI 150 (e.g., a daily view, a weekly view, a monthly view, etc.), a specific portion of the calendar view presented within native GUI 150 (e.g., an interval between 11:00 a.m. and 1:00 p.m. on Jun. 23, 2016), and one or more appointments identified within native GUI 150 (e.g., "Lunch with Joe" at 12:00 p.m.). The disclosed implementations are not limited to these examples of contextual data, and in other implementations, contextual data 122E may identify any additional or alternate characteristic indicative of the interaction of user 101 with the calendar application, or with any other appropriate foreground application executed by communications device 110.

In some aspects, VSP module 116 may transmit a request for the contextual data to client application module 114 through an appropriate programmatic interface, such as VSP API 114A. In response to the received request, client application module 114 may generate and provide contextual data 122E to VSP module 116 through the programmatic interface. In other aspects, client application module 114 may generate and provide portions of contextual data 122E to VSP module 116 at predetermined intervals, or alternatively, in response to a detection of certain triggering events, such as a modification to a portion of the calendar view presented by native GUI 150 or a transition to a different foreground application in response to input from user 101.

As described above, VSP module 116 may receive audio data 122D from microphone 112 and contextual data 122E from client application module 114. In some aspects, VSP module 116 may include a query module 116A, which may be configured to package portions of audio data 122D and contextual data 122E into query data 122F. Additionally, and upon generation of query data 122F, VSP module 116 may perform operations that cause communications device 110 to transmit query data 122F to a cloud-based system associated with the voice-service provider, such as computing system 130, across any of the communications networks described above. Computing system 130 may receive query data 122F, may extract portions of the audio and contextual data, and as described below, may establish a content and meaning of spoken utterance 104 based on an application of one or more of a speech-recognition algorithm, a natural-language processing algorithm, and a semantic parsing algorithm to portions of the extracted audio and contextual data.

For example, a speech recognition module 132 may apply one or more speech recognition algorithms to the extracted audio data. The one or more speech-recognition algorithms may include, but are not limited to, a hidden Markov model, a dynamic time-warping-based algorithm, and one or more neural networks, and based on the application of the one or more speech recognition algorithms, speech recognition module 132 may generate output including one or more linguistic elements, such as words and phrases, that represent utterance 104 spoken by user 101. For example, and as described above, spoken utterance 104 may correspond to a request by user 101 to "Move my 12:00 p.m. lunch to 12:30 p.m.," and based on the application of the one or more speech recognition algorithms, speech recognition module 132 may generate textual output data 142A that corresponds to spoken utterance 104, e.g., "move my 12:00 pm lunch to 12:30 pm."

Further, in some aspects, the application of the one or more speech recognition algorithms to the extracted audio data may identify multiple linguistic elements that could represent portions of spoken utterance 104 with varying degrees of confidence or certainty. For example, user 101 may interact with the calendar application while walking to off-site meeting, and a large delivery truck may pass user 101 as user 101 speaks utterance 104 into microphone 112. Due to the passage of the large delivery truck, the extracted audio data may include background noise that audibly obscures a portion of utterance 104, and speech recognition module 132 may be unable to identify linguistic elements that accurately represent the portion of utterance 104. In some aspects, and based on the extracted contextual data, speech recognition module 132 may bias the output of the one or more speech recognition algorithms toward linguistic elements that are contextually relevant to the current interaction of user 101 with the calendar application. For example, due to the background noise that obscures a portion of utterance 104 that includes the spoken word "move," speech recognition module 132 may generate output that identifies the words "prove," "move," and "groove" as potentially representative of the obscured portion of utterance 104. Based portions of the extracted contextual data that identify the current interaction of user 101 with the calendar application, speech recognition module 132 may bias the generated output towards the word "move," which is consistent and relevant to user 101's current interaction with the calendar application. In certain aspects, the biasing of the output of the one or more applied speech recognition algorithms towards linguistic elements that are contextually relevant to user 101's current interaction with the foreground application may improve the accuracy of not only the applied speech recognition algorithms, but also the natural language processing and semantic parsing algorithms that rely on textual output data 142A, as described below.

As described above, speech recognition module 132 may generate output data 142A that identifies the one or more linguistic elements that represent utterance 104, e.g., "move my 12:00 pm lunch to 12:30 pm." In some aspects, a natural language processing module 134 may receive textual output data 142A and further, may apply one or more natural language processing algorithms and semantic parsing algorithms to portions of textual output data 142A. Based on the application of the natural language processing algorithms and the semantic parsing algorithms to the portions of textual output data 142A, natural language processing module 134 may assign a meaning to linguistic elements representative of spoken utterance 104, and further, may generate structured data including commands and data inputs that, when passed to the calendar application, would cause the calendar application to perform operations consistent with the established meaning of spoken utterance 104.

In some aspects, natural language processing module 134 may include a semantic parsing module 134A, which receives textual output data 142A (e.g., including the text "move my 12:00 pm lunch to 12:30 pm") and the extracted contextual data. As described above, the extracted contextual data may identify the calendar application and include data characterizing user 101's current interaction with the calendar application. Additionally, semantic processing module 134A may access action database 136, and based on the extracted contextual data, obtain action data 142B that correlates particular text strings with one or more actions that may be performed by the calendar application. Action data 142 may also specify, for each of the actions, a structured format of application-specific commands and data inputs that, when processed by the calendar application, would cause the calendar application to perform operations consistent with spoken utterance 104.

For example, the calendar application may be associated with a particular action, such as "modify an event," having a corresponding set of data inputs, such as an event identifier, current values of one or more event parameters that characterize the event, and modified values of the event parameters. In some aspects, action data 142B may include data that correlates a text string (e.g., "reschedule an appointment") with the particular action (e.g., "modify an event") and further, that specifies a structured command format appropriate for input to the calendar application (e.g., {command=modify an event, (event, current event parameters, modified event parameters)}). The disclosed implementations are not limited to these examples of application-specific actions, correlated text strings, and structured command formats, and in other implementations, action data 142B may include data associated with any additional or alternate action appropriate to and implementable by the executed calendar application, which may include, but is not limited to, the actions of "add an event," "cancel an event," "switch calendar view," and "query."

Further, in certain instances, a developer of the calendar application may access an interface associated with computer system 130, such as a web page or digital portal, through a corresponding communications device. Via the accessed web page or digital portal, the developer may provide data that establishes and correlates the application-specific text strings to each of the actions appropriate to the calendar application, and further, that establishes the structured command format for each of the appropriate actions. Computing system 130 may, in some instances, store portions of the provided data within structured data records of action database 136, which may be accessed by natural language processing module 134 and/or semantic parsing module 134A using any of the processes described above. Further, as different executable applications may associate a particular text string with different actions and different structured formats of commands and data inputs, the application developer may provide additional data to computing system 130, e.g., through the website or digital portal, that establishes and correlates application-specific text strings to each of the actions appropriate to the different executable applications, and further, that establishes the structured format of application-specific commands and data inputs for each of these actions. As described above, computing system 130 may store portions of the application-specific data within corresponding structured data records of action database 136.

Semantic parsing module 134A may, in some aspects, apply one or more semantic parsing algorithms and speech biasing techniques to portions of output data 142A and action data 142B. Based on the application of these algorithms and techniques, semantic parsing module 134A may establish not only an application-specific meaning expressed by spoken utterance 104, but also a structured format of commands and data inputs that, when processed by the calendar application, cause the calendar application to perform operations consistent with the application-specific meaning. For example, output data 142A may include text that corresponds to spoken utterance 104 (e.g., "move my 12:00 pm lunch to 12:30 pm"), and action data 142 may correlate a representative text string (e.g., "reschedule an appointment") with a particular action performance by the calendar application (e.g., "modify an event"). Based on the application of the one or more semantic parsing algorithms and speech biasing techniques, semantic parsing module 134A may determine that spoken utterance 104 represents an intention by user 101 to "reschedule an appointment," which is correlated by action data 142 to the "modify an event" action. Further, and based on the structured command format associated with the "modify an event" action, semantic parsing module 134A may establish an event identifier corresponding to "lunch," current event parameters that include a scheduled 12:00 p.m. start time, and modified event parameters that include an modified 12:30 p.m. start time.

In certain aspects, semantic parsing module 134A may generate a structured response bundle 142C that identifies the action associated with utterance 104 (e.g., "modify an event"), event (e.g., the lunch), the current event parameters (e.g., the current 12:00 p.m. event start time), and the modified event parameters (e.g., the modified 12:30 p.m. start time). Structured response bundle 142C may, in certain aspects, be formatted in accordance with the structured command format associated with the identified action, and as described above, the calendar application executed by communications device 110 may process portions of structured response bundle 142C and perform operations consistent with spoken utterance 104. Natural language processing module 134, additionally or alternatively, semantic parsing module 134A, may perform operations that cause computing system 130 to transmit structured response bundle 142C to communications device 110 across any of the communications network described above.

Figure 1C:
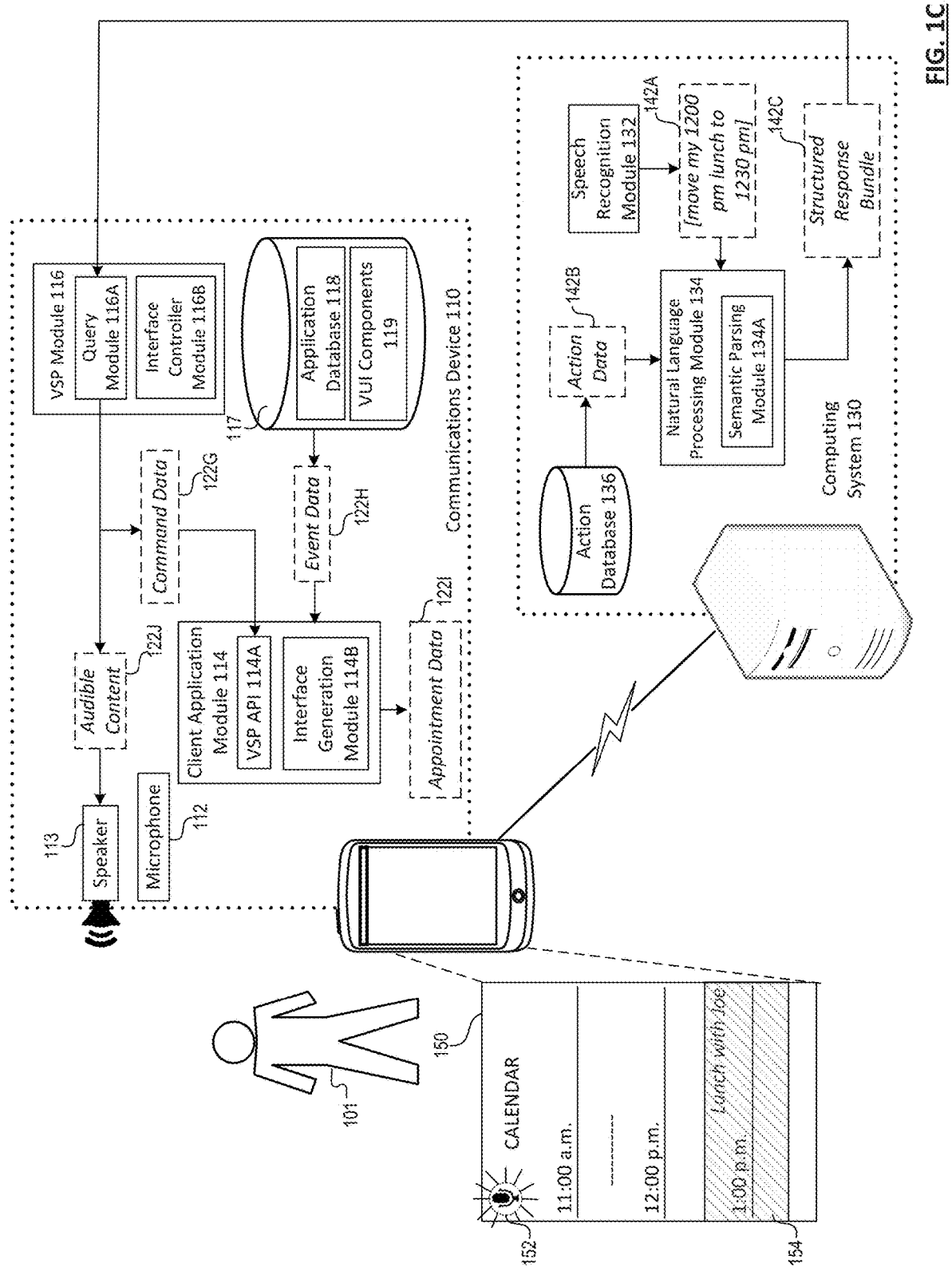

Referring to FIG. 1C, query module 116A may receive structured response bundle 142C from computing system 130, and may process structured response bundle 142C to extract command data 122G, which may be provided to client application module 114 through an appropriate programmatic interface, e.g., VSP API 114A. By way of example, command data 122G may include a portion of structured response bundle 142C that is formatted in accordance with the structured command format described above, and may include, but is not limited to, data identifying the action (e.g., "modify an event"), the event (e.g., the 12:00 p.m. lunch), the current event parameters (e.g., the 12:00 p.m. start time), and the modified event parameters (e.g., the modified 12:30 p.m. start time).

In certain aspects, client application module 114 may parse command data 122G, as structured in accordance with the corresponding command format, and based on portion of command data 122G, may perform operations consistent with spoken utterance 104. By way of example, client application module 114 may determine, based on the portions of command data 122G, that user 101 intends to reschedule an existing 12:00 p.m. lunch appointment to 12:30 p.m., and client application module 114 may access data repository 117 and obtain event data 122H that includes parameters of the existing 12:00 p.m. lunch, such as an event duration, one or more attendees, and a location of the event, and additional data identifying one or more additional events scheduled during a current day. For instance, and based on event data 122H, client application module 114 may determine that the existing 12:00 p.m. lunch is located at Del Frisco's and is scheduled to last one hour. Further, event data 122H may also establish that, other than the existing 12:00 p.m. lunch appointment, no further appointments are scheduled for user 101 during the current day.

Based on portions of event data 122H, client application module 114 may determine that no conflict exists between the rescheduled lunch appointment and user 101's schedule during the current day, and client application module 114 may perform operations that reschedule the existing 12:00 p.m. lunch appointment to 12:30 p.m. In some aspects, client application module 114 may generate appointment data 122I, portions of which may be transmitted to data repository 117 for storage within a corresponding portion of application data 118. In further aspects, interface generation module 114B may process portions of appointment data 122I and modify one or more of the interface elements presented within native GUI 150 to reflect the rescheduled appointment. For example, as illustrated in FIG. 1C, interface generation module may generate an additional interface element 154, which may reflect the rescheduled 12:30 p.m. lunch and the expected duration of one hour, and may presented within an appropriate portion of native GUI 150.

In certain aspects, as described above, structured response bundle 142C may include structured commands that, when processed by client application module 114, causes client application module 114 to perform operations consistent with an application specific meaning associated with spoken utterance 104. In other aspects, structured response bundle 142C may also include audible content that, when presented to user 101 through a corresponding audio interface, such as speaker 113, prompts user 101 to provide additional information within one or more follow-up utterances. For example, using any of the processes described above, computing system 130 may establish a text string (e.g., "Move my 12:00 p.m. lunch") that corresponds to spoken utterance 104, and may determine that the established text string represents to a request to modify an existing event within the calendar application (e.g., the "modify an event" action, as described above). In some instances, computing system 130 may identify an event (e.g., the 12:00 p.m. lunch appointment) and a current event parameter (e.g., the current 12:00 p.m. start time) associated with the requested modification, but may determine that spoken utterance 104 lacks one or more modified event parameters necessary to properly populate the structured command data that enables client application module 114 to reschedule the 12:00 p.m. lunch appointment.

To remedy these deficiencies, computing system 130 may generate data prompting user 101 to provide the one or more modified event parameters necessary to reschedule the existing 12:00 p.m. lunch appointment, and a text-to-speech (TTS) module of computing system (not depicted in FIGS. 1A-1C) may convert the generated data to audible content for presentation to user 101. For example, the generated data, and the converted audible content, may prompt user 101 to input a modified start time for the rescheduled lunch appointment, and computing system 130 may incorporate the converted audio content into a portion of structured response bundle 142C, which computing system 130 may transmit to communications device 110 using any of the processes described above.

As described above, query module 116A may receive structured response bundle 142C, which query module 116A may parse to extract audible content 112J. In some aspects, query module 116A may provide audible content 122J to speaker 113 for presentation to user 101. For example, audible content 112J may prompt user 101 to provide one or more modified event parameters for the rescheduled 12:00 p.m. lunch appointment, such as a modified start time or a modified appointment location, and user 101 verbally identify the modified start time (e.g., 12:30 p.m.) or the modified appointment location within one or more follow-up utterances, which may be captured by microphone 112 and processed by VSP module 112 and/or computing system 130 using any of the processes described above. In certain implementations, the inclusion of audible content within the structured response bundle 142C may enable communications device 110 to establish a dialogue with user 101 that facilitates a deeper and more intuitive voice-based interaction with and control of executed applications.

Further, in certain implementations described above, spoken utterance 104 may include one or more requests or inquiries associated with a particular application executed by communications device 110. In other implementations, spoken utterance 104 may include one or more generic inquiries that lack a relationship with any of the applications executed by communications device 110. For example, during an interaction with the executed calendar application, user 101 may utter a generic inquiry related to current weather conditions in Washington, D.C., prior to departing for a scheduled meeting, and microphone 112 may capture this additional utterance, which includes the generic inquiry related to the current weather conditions. Using any of the exemplary processes described above, query module 116A may transmit audio data that includes the additional utterance to computing system 130, and speech recognition module 132 of computing system 130 may generate textual output representative of the generic, weather-related inquiry. In some aspects, and based on the generated textual output, computing system 130 may query one or more external computing systems (e.g., through a corresponding programmatic interface) to obtain weather data indicative of the current conditions experienced in Washington, D.C., and computing system 130 may include portions of the weather data into structured response bundle 142C for transmission to communications device 110.

As described above, query module 116A may receive structured response bundle 142C, may parse structured response bundle 142C to extract the portions of the weather data (e.g., which may specify the current weather conditions in Washington, D.C.), and may provide the portions of the weather data to client application module 114 through a corresponding programmatic interface, e.g., VSP API 114A. In some aspects, interface generation module 1146 may generate one or more additional interface elements that provide a graphical or textual representation of the current weather conditions in Washington, D.C., and the one or more additional interface elements may be presented to user 101 within a corresponding portion of native GUI 150.

Further, in additional aspects, interface generation module 1146 may access VUI components 119 within data repository 117, and may obtain data that identifies one or more inquiry-specific interface elements and a corresponding view container that presents the one or more inquiry-specific interface elements within native GUI 150. For example, the inquiry-specific interface elements may include an informational or navigation card that simultaneously presents a graphical and textual representation of the current weather conditions. In some aspects, interface generation module 114B may populate the informational or navigation card with the current weather conditions in Washington, D.C., and may generate interface data that specifies the populated informational or navigation card, that specifies a position of the view container and the informational or navigation card within native GUI 150, and further, that configures the populated information or navigation card as an overlay card that obscures a portion of native GUI 150, as slide-up card or slide-down card that translates into or out of native GUI 150 along a corresponding longitudinal axis, or a drawer card that translates into or out of native GUI 150 along a transverse axis. As described above, a display unit of communications device 110, such as a pressure-sensitive touchscreen display, may render the generated interface data and present the view container and informational or navigation card within native GUI 150.

Further, in additional implementations, user 101 may provide additional input to communications device 110 that expresses an intention to terminate the previously initiated voice-based interaction with the calendar application. For example, the additional input may corresponding to a subsequent or follow-up selection of microphone icon 152, e.g., by touching or tapping a portion of a surface of the touchscreen display corresponding to microphone icon 152 with a finger or stylus. In response to a detection of the additional input, client application module 114 may generate a request to terminate the voice-interaction session, which client application module 114 may provide to VSP module 116 through an appropriate programmatic interface, such as VSP API 114A. As described above, VSP module 116 may receive the request to complete the voice-interaction session, and may generate and transmit a de-activation command to microphone 112, which modifies the operational state of microphone 112 from the "active" state to the "inactive" state. Additionally, and in certain aspects, client application module 114 may detect the change in the operational state of microphone 112, e.g., from the active to the inactive state, and interface generation module 114B may modify one or more visual characteristics of microphone icon 152 to reflect the active state of microphone 112. For example, interface generation module 114B may modify a color of microphone icon 152 (e.g., changing the color of microphone icon 152 from green back to red), modify a brightness of microphone icon 152, or implement any additional or alternate visually perceptible modification to the visual characteristics of microphone icon 152 to reflect the inactive state.

As described above, user 101 may express an intention to initiate voice-based interaction with a calendar application executed by communications device 110 by selecting a voice-user interface (VUI) element, e.g., microphone icon 152, presented within native GUI 150 associated with the calendar application, which may cause communications device 110 to activate an embedded microphone, such as microphone 112. Microphone 112 may capture one or more application-specific utterances spoken by the user, and communications device 110 may generate audio data that represents the spoken utterances and thus, an application-specific, contextual query spoken by user 101. In some aspects, communications device 110 may generate contextual query data that includes the generated audio data and further, contextual data indicative of the user's current interaction with the calendar application, and communications device 110 may transmit portions of the contextual query data (e.g., query data 122F) to computing system 130.

In certain aspects, and as described above, computing system 130 may determine a content and an application-specific meaning expressed the spoken utterances, and may generate a response to the contextual query (e.g., structured response bundle 142C) that identifies one or more application-specific operations or functions that are consistent with the expressed content and application-specific meaning. Computing system 130 may, in some implementations, transmit the generated response back to communications device 110, which captured the one or more spoken utterances and generated the contextual query data, and communications device 110 may perform operations that implement the one or more application-specific operations or functions using any of the processes described above.

In other implementations, computing system 130 may transmit the generated response to a communications device that is different from the communications device that captured the spoken utterances and generated the contextual query data. By way of example, user 101 may be associated with or may operate one or more additional communications devices, which include, but are not limited to, a smart watch, a home- or work-based connected device (such as a connected "Internet-of-Things" (IoT) device), and a vehicle-based device. These additional communications devices may store and execute various client application programs (e.g., a calendar application) and various application programs provided by a voice-service provider (such as a digital-assistant application). In some aspects, the client application programs and voice-service provider applications may be implemented as one or more modules of computer-program instructions (e.g., client application module 114 and/or VSP module 116, as described in reference to communications device 110 of FIGS. 1A-1C) that, upon execution, may cause one or more of the additional communications devices to capture application-specific utterances spoken by user 101, generate contextual query data that includes portions of the captured utterances and contextual data, and transmit the generated contextual query to computing system 130 using any of the processes described above.

Figure 1D:
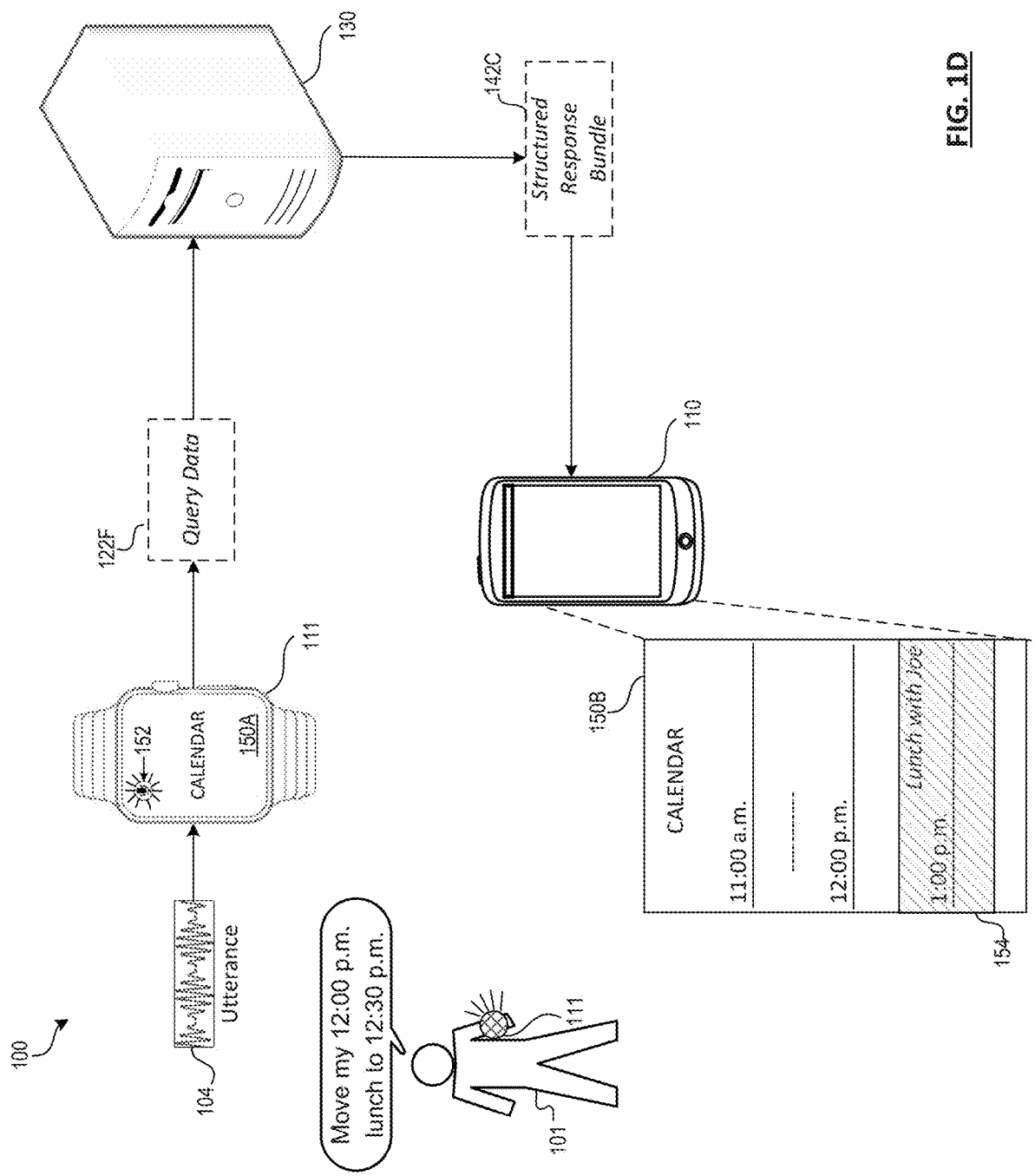

For example, as illustrated in FIG. 1D, the additional communications devices may include a device worn by user 101, e.g., smart watch 111, which may execute a calendar application that establishes and maintains a calendar of daily appointments on behalf of user 101. The daily appointments may, in some instances, include a scheduled 12:00 p.m. lunch with Joe, which user 101 may intend to reschedule to 12:30 p.m. In certain aspects, and using any the processes described above, user 101 may provide input to smart watch 111 that activates an embedded microphone (e.g., by selecting microphone icon 152 presented within a native GUI 150A of the executed calendar application), and the microphone may capture an utterance 104 spoken by user 101, which may specify to a request to delay a start time of the scheduled lunch (e.g., "Move my 12:00 p.m. lunch to 12:30 p.m."). In some aspects, the microphone may generate audio data that represents spoken utterance 104, and provide that generated audio data to a corresponding voice-service provider (VSP) module (e.g., VSP module 116 of FIGS. 1A-1C). Additionally in certain instances, a client application module of smart device 111 (e.g., client application module 114 of FIGS. 1A-1C) may perform any of the processes described above to generate contextual data indicative user 101's current interaction with the executed calendar application, which may also be provided as input to the VSP module.

Using any of the processes described above, smart watch 111 may generate contextual query data, e.g., query data 122F, that includes portions of the generated audio data and contextual data, and smart watch 111 may transmit query data 122F to a cloud-based system associated with the voice-service provider, such as computing system 130, across any of the communications networks described above. Computing system 130 may receive query data 122F, may extract portions of the audio and contextual data, and as described above, may establish not only an application-specific meaning expressed by spoken utterance 104, but also a structured format of commands and data inputs that, when processed by the calendar application, cause the calendar application to perform operations consistent with the application-specific meaning.

For example, and based on the application of the one or more semantic parsing algorithms and speech biasing techniques described above, computing system 130 may determine that spoken utterance 104 represents an intention by user 101 to "reschedule an appointment," which may be correlated by computing system 130 to the "modify an event" action (e.g., based on action data 142B of FIGS. 1B and 1C). Further, and based on the structured command format associated with the "modify an event" action, computing system 130 may establish an event identifier corresponding to "lunch," current event parameters that include a scheduled 12:00 p.m. start time, and modified event parameters that include an modified 12:30 p.m. start time. In certain aspects, computing system 130 may generate a response to the contextual query, e.g., structured response bundle 142C, that identifies the action associated with spoken utterance 104 e.g., "modify an event"), the event (e.g., the lunch), the current event parameters (e.g., the current 12:00 p.m. event start time), and the modified event parameters (e.g., the modified 12:30 p.m. start time).

In one implementation, computing system 130 may transmit structured response bundle 142C back to smart watch 111. Smart watch 111 may, in some instances, receive and process structured response bundle 142C, extract command data structured in accordance with the corresponding structured command format, and as described above, provide that structured command data to the executed calendar application through a corresponding programmatic interface, such as VSP API 114A. As described above, the executed calendar application may perform operations consistent with spoken utterance 104, which include, but are not limited to, rescheduling the lunch from 12:00 p.m. to 12:30 p.m., presenting, through a display unit, interface elements indicative of the rescheduled lunch within native GUI 150A, and presenting audible, follow-up inquiries through a corresponding audio interface, such as an embedded speaker.

In other implementations, computing system 130 may transmit portions of structured response bundle 142C to one or more additional communications devices associated with user 101 and additionally or alternatively, one or more additional users. For example, spoken utterance 104 may also include spoken content identifying a "destination" device, such as user 101's smartphone or tablet computer, that should present a notification of the rescheduled lunch to user 101. In some aspects, and using any of the processes described above, smart watch 111 may parse audio data representing spoken utterance 104 to identify not only the requested modification to the scheduled lunch (e.g., "Move my 12:00 p.m. lunch to 12:30 p.m."), but also an identifier of the destination device (e.g., "my smartphone"), and may generate portions of query data 122F that includes the requested modification to the scheduled appointment, the contextual data indicative of user 101's current interaction with the executed calendar application, and further, the identifier of the destination device.

Computing system 130 may receive query data 122F, and may generate structured response bundle 142C that identifies the action associated with spoken utterance 104 (e.g., "modify an event"), the event (e.g., the lunch), the current event parameters (e.g., the current 12:00 p.m. event start time), and the modified event parameters (e.g., the modified 12:30 p.m. start time). Computing system 130 may also access device data (e.g., as stored within one or more local data repositories or remotely accessible data repositories, such as cloud-based storage) that identifies one or more communications devices associated with or operated by user 101 and additionally or alternatively, unique network identifiers of these communications devices (e.g., MAC addresses, IP addresses, etc.). In some aspects, and based on the accessed device data, computing system 130 may determine that communications device 110 corresponds to user 101's smartphone, may access the unique network identifier of communications device 110, and may transmit structured response bundle 142C to communications device 110 using any of the processes described above.

As described above, communications device 110 may receive structured response bundle 146, extract command data indicative of the requested modification to user 101's daily appointments from structured response bundle 146, and provide that extracted command data to the executed calendar application, which may implement the requested modification in accordance with the provided command data. For example, and based on the extracted command data, the executed calendar application may reschedule to the 12:00 p.m. lunch to 12:30 p.m., and may generate one or more interface elements indicative of the effected modification for presentation within the native GUI of the calendar application (such as additional interface element 154, which reflects the rescheduled 12:00 p.m. lunch and the expected duration of one hour, as presented within native GUI 150B).

In certain implementations described above, user 101 may identify, within a spoken utterance, one or more "destination" devices capable of receiving a structured response to a contextual query and performing one or more operations consistent spoken utterance 104, such as modifying a scheduled appointment and/or presenting interface elements indicative of the modification. In other implementations, computing system 130 may identify the one or more destination device based not on an corresponding identifier spoken by user 101, but based on stored configuration data that associates the one or more candidate destination device with user 101, smart watch 111, and additionally or alternatively, a scope or a nature of the corresponding contextual query.

By way of example, query data 122F may include data identifying user 101 (e.g., a user name, email address, telephone number, etc.) and data identifying smart watch 111 (e.g., an IP address, a MAC address, a device identifier, etc.). In some aspects, upon receipt of query data 122F, computing system 130 may access configuration data (e.g., as stored within one or more local data repositories or remotely accessible data repositories, such as cloud-based storage) that includes one or more logical rules associating identifiers of candidate destination devices with corresponding characteristics of various contextual queries. These characteristics may include, but are not limited to, an action associated with a contextual query (e.g., "modify an event"), an event associated with the action, one or more current or modified event parameters, a user associated with the contextual query (e.g., user 101), a device that generated the contextual query (e.g., smart watch 111, a connected IoT device, a vehicle-based device, etc.), and one or more application programs associated with the action (e.g., the executed calendar application). Further, portions of the configuration data may be established by computing system 130 based on capabilities of the devices that generated the contextual queries and the destination devices, and additionally or alternatively, portions of the configuration data may be established based on user input received through a corresponding web page or digital portal associated with the voice-service provider.

For instance, the access configuration data may identify communications device 110 as a "destination" device for a contextual query generated by smart watch 111, involving user 101, and associated with a modification to an appointment scheduled by an executed application program. In some aspects, computing system 130 may obtain, from the obtained configuration data (or from the device data described above) a unique network identifier of communications device 110 (e.g., a MAC address, an IP address, etc.), and may transmit structured response bundle 142C to communications device 110, which may perform operations consistent with command data included within structured response bundle 142C using any of the example processes described above.

As described above, user 101 may express an intention to initiate voice-based interaction with the calendar application by selecting a voice-user interface (VUI) element, such as a microphone icon, presented within a native GUI associated with the calendar application. Although described in terms of the calendar application, the disclosed implementations are not limited to this example application, and the microphone icon and other VUI elements may be embedded within the native GUIs of any additional or alternate application executed by communications device 110 to facilitate voice-based interaction and control of the executed applications by user 101. In some instances, and as described below, a developer of an executed application may access one or more VUI elements, which may collectively specify a VUI "toolkit." The accessed data may, for example, include widgets or other elements of executable code associated with each of the VUI elements, and the developer may link the widget or executable code associated with one or more of the VUI elements to corresponding ones of the executed applications such that these executed applications embed the one or more VUI elements into their native GUIs. In certain aspects, the embedded VUI elements may facilitate an initiation, by user 101, of voice-based interaction and control of the corresponding executed applications using any of the processes described above.

Figure 2:
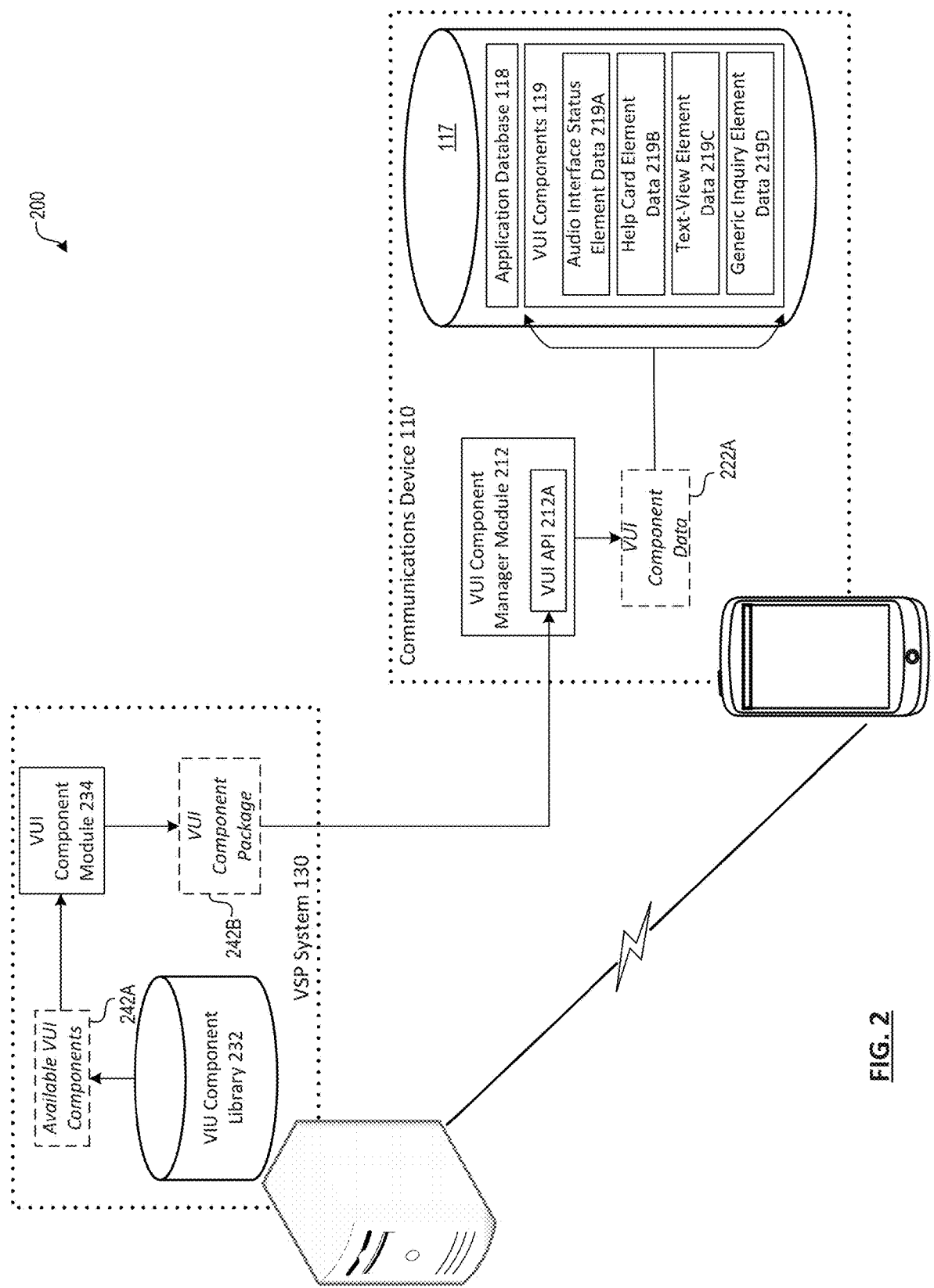

FIG. 2 is a diagram of an exemplary system 200 for integrating voice-user interface (VUI) elements into a native graphical user interfaces (GUIs) generated by various executed applications, in accordance with certain exemplary implementations. In some aspects, system 200 may include communications device 110 and voice-service provider (VSP) system 130, as described above. Further, although not depicted in FIGS. 2A and 2B, system 200 may also include a communications network that interconnects various components of system 200, such as communication device 110 and computing system 130. For example, and as described above, the communications network may include, but is not limited to, a wireless local area network (LAN), e.g., a "WiFi" network, a RF network, a Near Field Communication (NFC) network, a wireless Metropolitan Area Network (MAN) connecting multiple wireless LANs, and a wide area network (WAN), e.g., the Internet.

Referring to FIG. 2, computing system 130 may include a VUI component library 232, which may include structured data records that store data characterizing a plurality of available VUI elements. In certain aspects, and in contrast to the application-specific GUI elements that establish native GUIs of various executed applications, the available VUI elements may be application-neutral and may be embedded within any of the native GUIs to facilitate, initiate, and terminate voice-based interaction and control of the corresponding executed applications.

For example, VUI component library 232 may store a widget and/or elements of executable code that establish and embed a microphone icon (e.g., microphone icon 152 of FIGS. 1A, 1B, and 1C) into a native GUI of one or more executable applications. The microphone icon may, in some instances, indicate an activity or inactivity of a microphone included within a corresponding computing device, such as communications device 110, and selection of the microphone icon embedded within the native GUI by user 101 may facilitate an initiation, a pause, a resumption, or a termination of voice-based interaction and control of the corresponding executable application, as described above. The disclosed implementations are not limited with these examples of audio interfaces, and in other implementations, VUI component library 232 may store a widget and/or elements of executable code that establish and embed icons associated with other audio interfaces, such as speakers, into the native GUIs to indicate a status and level of activity associated with these audio interfaces.

In other instances, VUI component library 232 may store widgets and/or elements of executable code that establish interface elements, e.g., "help cards," that present textual representations of various requests or inquiries commonly uttered by user 101. In some aspects, one or more of these help cards may be context-specific, and may suggest requests or inquiries commonly uttered by user 101 during interaction with specific applications, certain application views (e.g., a day or monthly calendar view), and additionally or alternatively, certain combinations of GUI elements associated with a particular application view. For example, a program module of an application executed by communications device 110, e.g., client application module 114, may determine a context indicative of user 101's current interaction with the executed application and may identify one or more of the help cards that are appropriate to and consistent with the determined context, and an interface generation module of the executed application, e.g., interface generation module 1146, may present the one or more identified help cards within a corresponding portion of the executed application's native GUI, e.g., native GUI 150.

VUI component library 232 may also store widgets and/or elements of executable code that establish interface elements, e.g., "text view" elements, capable of displaying, to user 101, portions of textual content recognized within spoken utterances, e.g., spoken utterance 104. For example, the stored widgets and/or executable code elements may be linked, through an appropriate programmatic interface, to a voice-service provider (VSP) application, such as a digital virtual assistant application executed by communications device 110, and may be configured to obtain portions of text recognized in real-time by the VSP application from spoken utterance 104. In some aspects, interface generation module 1146 may incorporate one or more of the text view elements into native GUI 150, and upon presentation to user 101, the text view elements may present a time-evolving representation of textual content corresponding to spoken utterance 104.

Additional, and in further instances, VUI component library 232 may also store widgets and/or elements of executable code that establish one or more inquiry-specific interface elements and a corresponding view container that presents the one or more inquiry-specific interface elements within native GUI 150. For example, and as described above, the inquiry-specific interface elements may include an informational or navigation card that simultaneously presents a graphical and textual representation of responses to one or more generic inquiries, such as weather inquiries, inquiries about current events or media personalities, and other inquiries unrelated to an operation of the applications executed by communications device 110. In some aspects, interface generation module 114B may populate the informational or navigation card with portions of the responses to the one or more generic inquiries (e.g., as received from one or more external or third-party computing systems), and may generate interface data that specifies the populated informational or navigation card, that specifies a position of the view condition and the informational or navigation card within native GUI 150, and further, that configures the populated information or navigation card as an overlay card that obscures a portion of native GUI 150, as slide-up card or slide-down card that translates into or out of native GUI 150 along a corresponding longitudinal axis, or a drawer card that translates into or out of native GUI 150 along a transverse axis. The disclosed implementations are, however, not limited to these examples of VUI components and VUI elements, and in other implementations, VUI component library 232 may store structured data indicative of any additional or alternate VUI component or interface data, which may be embedded into a native GUI of an application executed by communications device 110 to facilitate voice-based interaction and control.

In some instances, computer system 130 may execute one or more application programs that generate and provide to communications device 110 a package of VUI components for inclusion within native GUIs of applications executed by communications device 110. For example, a VUI component module 234 of computing system 130 may access VUI component library 232 and obtain data 242A identifying one or more VUI components. VUI component module 234 may identify a subset of the VUI components that are consistent with one or more characteristics of communications device 110, such as version of an operating system, and with one or more of the application programs executed by communications device 110. In some instances, VUI component module 234 may obtain the widgets and/or executable code elements associated with the subset of VUI components within VUI component data 242A, and may incorporate a portion of data 242A into a corresponding structured data package for transmission to communications device 110 across any of the communications networks described above.

For example, VUI component module 234 may incorporate portions of data 242A within a dynamically linked supporting library. VUI component module 234 may generate a VUI component package 242B that includes the linked or dynamically linked supporting library, and transmit VUI component package 242B to communications device 110, as described above. In other aspects, VUI component module 234 may obtain elements of code that establish a corresponding programmatic interface, and transmit the obtained code elements to communications device 110 across any of the communications networks described above. Communications device 110 may, in some instances, execute the transmitted code elements to establish the corresponding programmatic interface, and VUI component module 234 may perform operations that push portions of data 242A to communications device 110 through the established programmatic interface at predetermined time or in response to a detection of certain triggering events, such as an update to or a modification of the VUI component data stored within VUI component library 232.

In some aspects, a VUI component manager module 212 of communications device 110 may receive VUI component package 242B through a corresponding programmatic interface, e.g., VUI API 212A. VUI component manager module 212 may process or parse portions of VUI component package 242B to extract VUI component data 222A, and may perform operations that store portions of VUI component data 222A within one or more data records of structured data repository 117, such as within VUI components 119. For example, and as described above, the stored VUI component data may include, but is not limited to: (i) audio interface status element data 219A, which include widgets and/or elements of executable code that establish and embed icons and interface elements indicative of a status of an audio interface, such as a microphone or speaker, into a native GUI of an executable application; (ii) help card data 2196, which may include widgets and/or elements of executable code establishing interface elements, or help cards, that present textual representations of various, commonly uttered requests or inquiries; (iii) text-view element data 219C, which includes widgets and/or elements of executable code that establish text-view interface elements capable of displaying, in real-time, portions of textual content recognized within spoken utterances; and (iv) generic inquiry element data 219D, which includes widgets and/or elements of executable code that establish one or more inquiry-specific interface elements and corresponding view containers that presents the one or more inquiry-specific interface elements within the native GUIs. The disclosed implementations are, however, not limited to these examples of VUI components and VUI elements, and in other implementations, VUI component manager 212 may store, within data repository 117, structured data indicative of any additional or alternate VUI component or element that facilitate voice-based interaction with one or more applications executed by communications device 110.

In certain implementations, a developer of a particular application, such as the calendar application described above, may perform operations that embed one or more of the stored VUI component, as described above, into a native GUI of the calendar application to facilitate a user's voice-based interaction with the executed calendar application. For example, data repository 117 may store portions of the VUI component data as statically or dynamically linked libraries, and the application developer may provide input to communications device 110, e.g., in response to an accessed digital portal or GUI associated with a text editor, that links the libraries associated with one or more of the VUI components to an object file associated with the calendar application. In response to the established linkage, communications device 110 (and other devices capable of accessing the linked object file and VUI component libraries) may execute the calendar application present interface elements corresponding to the one or more linked VUI components within portions of the native GUI associated with the calendar application, e.g., GUI 150 of FIGS. 1A-1C.

For example, the application developer may intend to embed an icon representative of a microphone into native GUI 150 of the calendar application. As described above, the microphone icon may, in some instances, indicate an activity or inactivity of a microphone included within a corresponding computing device, such as communications device 110, and a selection of the microphone icon embedded within the native GUI by user 101 may facilitate an initiation, a pause, a resumption, or a termination of voice-based interaction and control of the corresponding executable application. In some aspects, and as described above, the application developer may perform operations that link the widgets and/or executable code associated with the microphone icon, such as those stored within audio interface status element data 219A of FIG. 2, with the object file associated with the calendar application. Upon execution by communications device 110, the calendar application may generate a native GUI, such as native GUI 150 of FIGS. 1A-1C, and embed within native GUI 150 a corresponding microphone icon, e.g., icon 152 of FIGS. 1A-1C, which may visually convey a current status of the microphone to a user and enable the user to provide input initiating voice-based interaction and control of the calendar application.

For example, and as described above, a user may provide input to communications device 110 that selects microphone icon 152, e.g., by touching or tapping a portion of a surface of the touchscreen display corresponding to microphone icon 152 with a finger or stylus. In response to the provided input, the widgets and/or executable code that establish microphone icon 152 may cause the calendar application (e.g., via client application module 114 FIGS. 1A-1C) to generate and provide a request to initiate the voice-based interaction to a VSP application through a corresponding programmatic interface (e.g., VSP API 114A of FIGS. 1A-1C). The VSP application (e.g., via VSP module 116 of FIGS. 1A-1C) may generate a signal that activates a microphone (e.g., microphone 112 of FIGS. 1A-1C), and causes the executed calendar application to modify one or more visual characteristics of microphone icon 152 to reflect the active state of microphone 112, as described above. In certain implementations, and upon activation of microphone 112, user 101 may speak one or more utterances related to a function or an operation of the calendar application, and communications device 110 and/or computing system 130 may perform operations that facilitate the user's voice-based interaction with and control of the executed calendar application using any of the exemplary processes described above.

Referring back to FIG. 2, computing system 130 may, in some instances, update or modify portions of the VUI component data stored within VUI component library 232, and provide additional VUI component packages to communication device 110 and other communications devices that reflect these modifications or updates a regular intervals on in response to the each instance of an update or modification. For example, computing system 130 may be configured to receive data indicative of additional audio interfaces associated with one or more communications device, and VUI component module 234 may generate (or obtain) widgets and/or executable code elements that establish and embed icons and interface elements indicative of a status of the additional audio interfaces into a native GUI of an executable application. In some instances, VUI component module may store these widgets and/or executable code elements as an update to VUI component library 232, and may also generate and transmit to communications device 110 an updated VUI component package that includes these widgets and/or executable code elements using any of the processes described above.

Further, in additional aspects (not depicted in FIG. 2), computing system 130 may be in communication with additional back-end systems and server maintained by the voice-service provider, such as back-end systems that perform one or more of the speech recognition, natural language processing, and semantic parsing processes described above. In other implementations, the generation, maintenance, and provision of application-neutral VUI component libraries need not be performed by application programs and software modules executed by computing system 130. For example, another back-end computing system or server maintained by the voice-service provider or by a third-party entity may be in communication with computing system 130, and may be configured to perform any of the processes described above that generate, maintain, and distribute the application-neutral VUI component libraries to various computing devices.

Figure 3A:
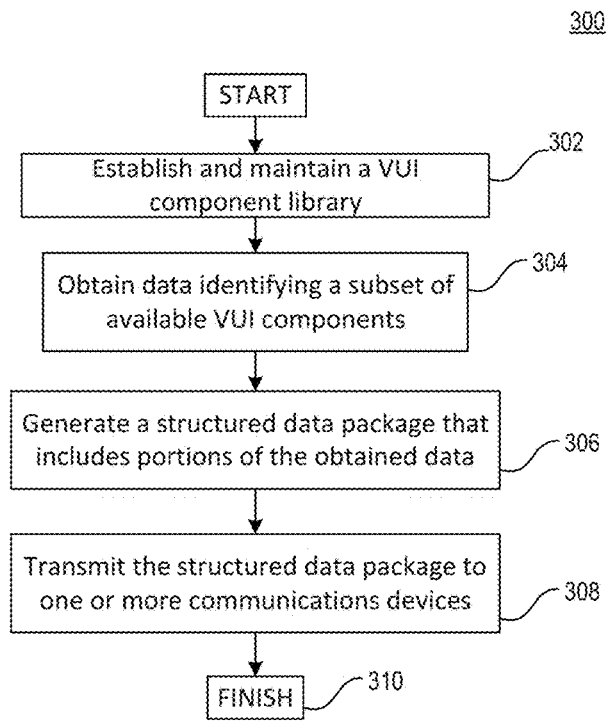
FIGS. 3A and 3B are flowcharts of exemplary processes for integrating common voice-user interface components into graphical user interfaces of executed applications.

FIG. 3A is a flowchart of an exemplary process 300 for integrating voice-user interface (VUI) elements into a native graphical user interfaces (GUIs) generated by various executed applications, in accordance with certain exemplary implementations. In some aspects, a computing system (e.g., computing system 130) may perform the steps of exemplary process 300, which may enable computing system 130 to maintain and populate a library of available VUI components and elements, to generate a VUI component package that includes a subset of the available VUI components and elements, and to provide the generated package to one or more communications devices, which may embed one or more of the available VUI components and elements into native GUIs of executed applications.

In some aspects, computing system 130 may establish and maintain a VUI component library, such as VUI component library 232 of FIG. 2, which may include structured data records that store data characterized a plurality of available VUI components and elements (e.g., in step 302). As described above, in contrast to the application-specific GUI elements that establish native GUIs of applications executed by various communications devices, the available VUI elements may be application neutral and may be embedded within any of the native GUIs to facilitate, initiate, and terminate voice-based interaction and control of the corresponding executed applications. In some aspects, computing system 130 may include, within the VUI component library, one or more widgets and elements of executable code that establish the VUI component and elements, specify one or more visual characteristics of the presentation of these VUI component and elements within corresponding native GUIs, and additionally or alternatively, specify and interaction of the VUI components and interfaces with the executed application and with other applications executed by the various communications devices, such as the such as digital assistant applications and VSP applications described above.

For example, the VUI component library established by VUI system 130 may include, but is not limited to: (i) widgets and/or elements of executable code that establish and embed icons and interface elements indicative of a status of an audio interface, such as a microphone or speaker, into a native GUI of an executable application; (ii) widgets and/or elements of executable code establishing help-card interface elements that present textual representations of commonly uttered requests or inquiries; (iii) widgets and/or elements of executable code that establish text-view interface elements capable of displaying, in real-time, portions of textual content recognized within spoken utterances; and (iv) widgets and/or elements of executable code that establish one or more interface elements and corresponding view containers capable of presenting results to various generic inquiries uttered by the user during the voice-based interaction with the executed applications. The disclosed implementations are, however, not limited to these examples of VUI components, and in other implementations, computing system 130 may store, within the VUI component library, structured data indicative of any additional or alternate VUI component that facilitates voice-based interaction with applications executed by the various communications devices.

Computing system 130 may, in some aspects, access the established and maintained VUI component library and obtain data identifying a subset of the available VUI components or elements (e.g., in step 304). For example, computing system 130 may identify a subset of the available VUI components that are consistent with one or more characteristics of one or more communications devices (e.g., communications device 110), such as version of an operating system, and with one or more of the application programs executed by the one or more communications devices. In some instances, computing system 130 may obtain data identifying the widgets and/or executable code elements associated with the subset of VUI components and elements, and may incorporate the obtained data into a corresponding structured data package for transmission to the one or more communications devices across any of the communications networks described above (e.g., in step 306).

For example, in step 306, computing system 130 may incorporate portions of the obtained data (e.g., the widgets and/or executable code) into a statically linked or dynamically linked supporting library, and may include the statically linked or dynamically linked supporting library within the generated structured data package. In some aspects, computing system 130 may transmit the structured data package to the one or more communications devices across any of the communications networks described above (e.g., in step 308). Exemplary process 300 may then be completed in step 310.

In other aspects, computing system 130 may obtain elements of code that establish a corresponding programmatic interface, and transmit the obtained code elements to the one or more communications devices across any of the communications networks described above (e.g., in step 308). The one or more communications devices may, in some instances, execute the transmitted code elements to establish the corresponding programmatic interface, and computing system 130 may perform operations that push portions of the obtained data to the one or more communications devices through the established programmatic interface at predetermined times or in response to a detection of certain triggering events, such as an update to or a modification of the VUI component data stored within the VUI component library.

In certain implementations, a developer of a particular application, such as the calendar application, may perform operations that embed one or more of the stored VUI component or element, as described above, into a native GUI of the calendar application to facilitate a user's voice-based interaction with the executed calendar application. For example, and as described above, computing system 130 may generate statically or dynamically linked libraries of the widgets and/or executable code elements specifying one or more VUI components or elements, and these statically or dynamically linked libraries may be provided to the one or more communications devices that execute the calendar application. In some aspects, and using any of the processes described above, the application developer may link the libraries associated with one or more of the VUI components to an object file associated with the calendar application. In response to the established linkage, and as described below in reference to FIG. 3B, the one or more communications devices may execute the calendar application, which may present interface elements corresponding to the one or more linked VUI components within portions of the native GUI associated with the calendar application.

Figure 3B:
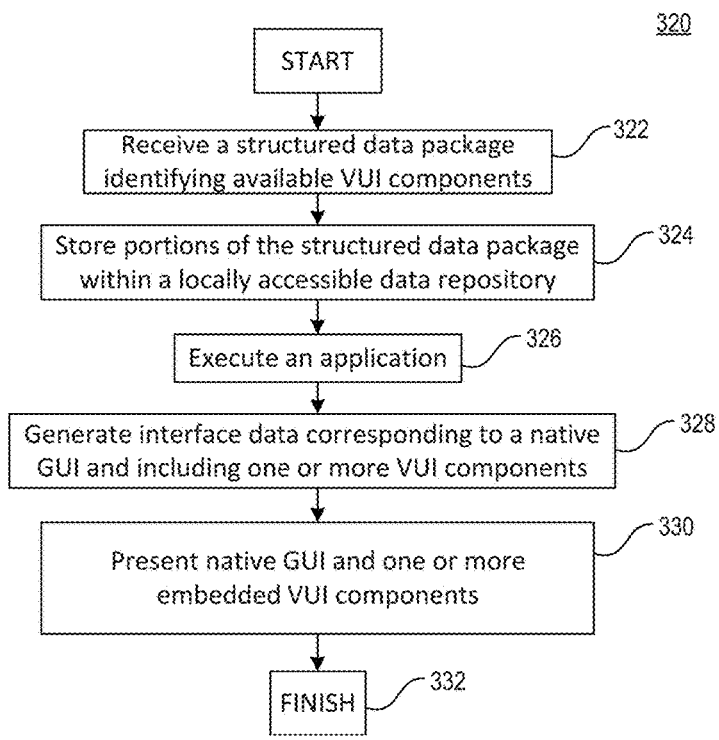

FIG. 3B is a flowchart of an additional exemplary process 320 for integrating voice-user interface (VUI) elements into native graphical user interfaces (GUIs) generated by various executed applications, in accordance with certain implementations. In some aspects, a communications device (e.g., communications device 110) may perform the steps of exemplary process 320, which may enable communications device 110 to obtain a library of widgets and/or executable code elements that specifying one or more VUI components, to execute an application program linked to the obtained library, and to embed interface elements associated with the one or more VUI components within a native GUI of the executed application.

In one aspect, communications device 110 may receive a structured data package that identifies widgets and/or elements of executable code associated with one or more VUI components (e.g., in step 322). As described above, the one or more VUI components may be appropriate to and consistent with communications device 110, operating characteristics of communications device 110, and additionally or alternatively, one or more application programs executed by communications device 110. Further, in some aspects, the structured data package may include a statically or dynamically linked library of the widgets and/or executable code elements associated with the one or more VUI components. Communications device 110 may, in some aspects, also perform operations that store portions of the structured data package, including the statically or dynamically linked supporting libraries, within a locally accessible data repository, such as VUI components 119 of data repository 117 (e.g., in step 324).

In some aspects, as described above, a developer of an application executed by communications device 110, such as a calendar application, may link at least a portion of the stored supporting library to a corresponding application object file. For example, the developer may intend to embed an icon associated with a microphone of the communications device within a native GUI generated by the executed calendar application, and may link the supporting library associated with the microphone icon to the object file associated with the calendar application. As described above, the supporting library associated with the microphone icon may include widgets or executable code elements that embed the microphone icon within a corresponding portion of the native GUI of the calendar application and further, upon selection by a user, cause communications device 110 to perform operations that initiate the user's voice-based interaction and control of the executed application.

Referring back to FIG. 3B, communications device 110 may be configured to execute a particular application program, such as the calendar application (e.g., in step 326), and generate interface data associated with the corresponding native GUI (e.g., in step 328). As described above, the supporting library associated with the microphone icon may be linked to the object file of the calendar application, and upon execution of the calendar application, communications device 110 may include, within the interface data, interface elements that correspond to the embedded microphone icon. In some aspects, communications device 110 may render the generated interface data for presentation, and present the native GUI and embedded microphone icon to the user via a corresponding display unit, such as a pressure-sensitive, touchscreen display (e.g., in step 330). In some aspects, the user may provide input to communications device 110 that selects the embedded microphone icon, and in response to the provided input, communications device 110 may initiate a voice-based interaction and control of the executed calendar application using any of the processes described herein. Exemplary process 320 may then be completed in step 332.

Figure 4:
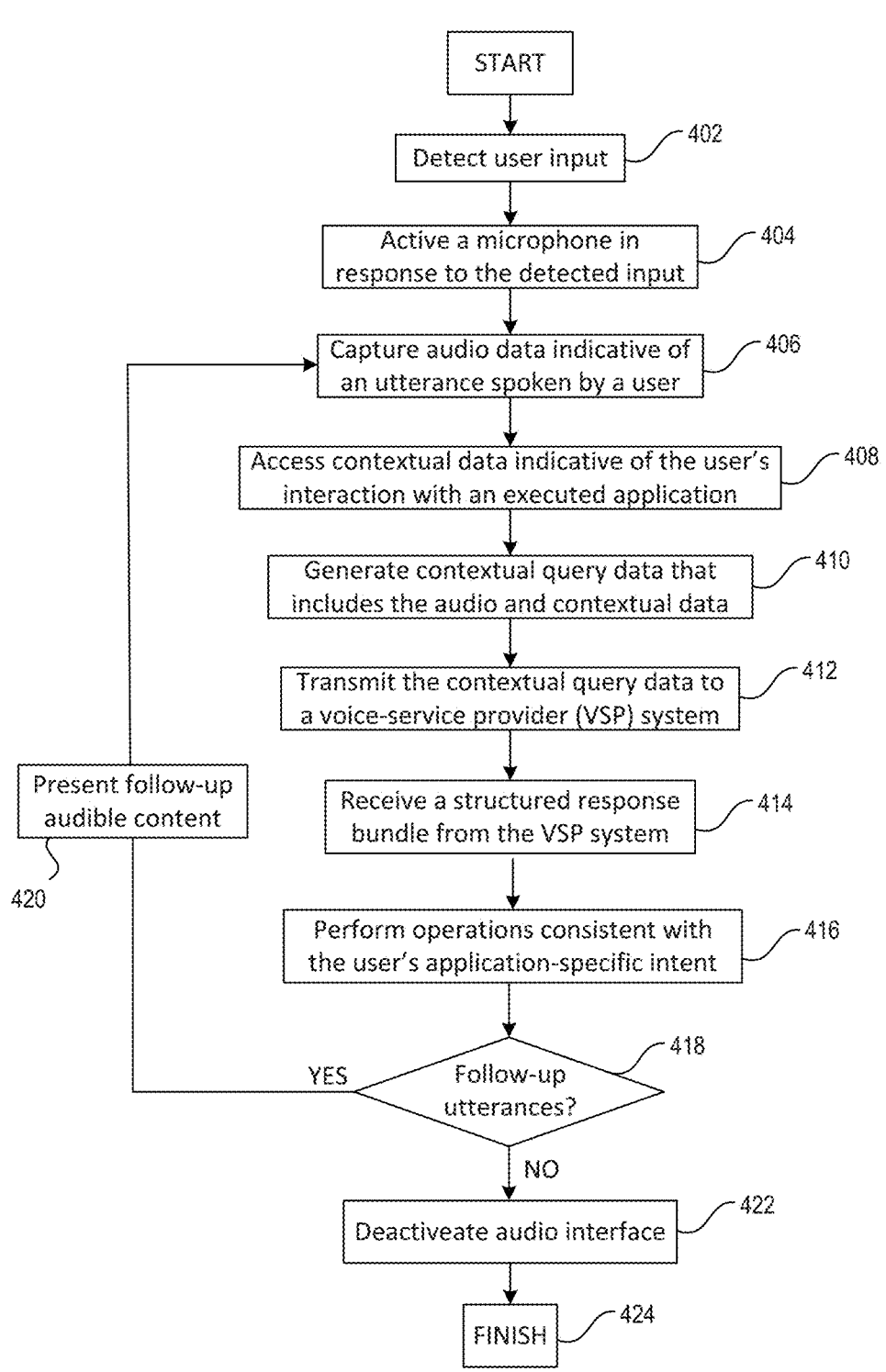
FIGS. 4 and 5 are flowcharts of exemplary processes for facilitating voice interaction with and voice-based control of executed applications.

FIG. 4 is a flowchart of an exemplary process 400 for initiating and performing voice-based interaction with and control of an executed application, in accordance with certain exemplary implementations. In some aspects, a communications device (e.g., communications device 110) may perform the steps of exemplary process 400, which may enable communications device 110 to initiate a voice-based interaction with an executed application based on detected user input, to capture audio data indicative of an utterance spoken by the user, to determine a content and an application-specific intent of the spoken utterance, and further, to perform application-specific operations consistent with the determined content and intent.

For example, and as described above, communications device 110 may execute a client application, such as a calendar application, and communications device 110 may generate and present a native graphical user interface (GUI) associated with the calendar application to the user through a corresponding display unit, such as a pressure-sensitive, touchscreen display. The native GUI may include interface elements that specify one or more scheduled appointments throughout a calendar day, week, or month, and the user may provide touch-based input to communications device 110 to access the various functionalities of the executed calendar application, as described above. In some aspects, the native GUI may include one or more interface elements associated with corresponding components of a voice-user interface (VUI), which may integrate voice-based interaction and control into the native GUI. Further, and as described above, the native GUI may include an embedded microphone icon, and the user may express an intention to initiate voice-based interaction with the calendar application by providing input to communications device 110 that selects the embedded microphone icon, e.g., by touching or tapping a portion of a surface of the touchscreen display corresponding to the microphone icon with a finger or stylus.

In some aspects, communications device 110 may detect the user's selection of the embedded microphone icon (e.g., in step 402). In response to the detected input, and using any of the processes described above, communications device 110 may perform operations that activate the microphone and modify one or more visual characteristics of the embedded microphone icon to indicate the newly activated state (e.g., in step 404). For example, the executed calendar application may detected the user's selection of the embedded microphone icon, and may transmit a request to initiate a voice-interaction session to a voice-service provider (VSP) application through a corresponding programmatic interface. In some instances, the VSP application may corresponding to a voice-based digital personal assistant application. The VSP application may receive the request through the programmatic interface, and generate and provide to the microphone and activation command that modifies an operation state of the microphone 112 from an "inactive" state to an "active" state, which may enable the microphone to detect and capture utterances spoken by the user. Additionally, and in certain aspects, the executed calendar application may detect the change in the operational state of the microphone, e.g., from the inactive to the active state, and may modify one or more visual characteristics of the microphone icon to reflect the active state of the microphone, as described above.

In certain aspects, and upon activation of the microphone, the user may speak one or more utterances related to a function or an operation of the calendar application. For example, the utterances may be free-form utterances or may be prompted by textual or graphical content presented within the native GUI, such as a presented interface element that identifies inquiries or commands commonly spoken by users of the calendar application. In some aspects, the microphone may capture the spoken utterance, and communications device 110 may generate audio data that includes the captured utterance and may provide portions of the generated audio data as an input to the VSP application (e.g., in step 406).

Communications device 110 may also obtain contextual data indicative of the user's current interaction with the executed calendar application, and may provide portions of the obtained contextual data to the VSP application through the corresponding programmatic interface (e.g., in step 408). For example, the obtained contextual data may identify the executed calendar application (e.g., a foreground application current accessed by the user) and a version or a particular release of the calendar application. The obtained contextual data may also include data that characterizes content currently viewed by the within the native GUI of the calendar application, such a type of calendar view presented within the native GUI (e.g., a daily view, a monthly view, etc.), a specific portion of that calendar view presented within the native GUI (e.g., an interval between 11:00 a.m. and 1:00 p.m. on Jun. 23, 2016), and one or more appointments identified within native GUI 150 (e.g., "Lunch with Joe" at 12:00 p.m.). The disclosed implementations are not limited to these examples of contextual data, and in other implementations, the obtained contextual may identify any additional or alternate characteristic indicative of the user's interaction with the calendar application, or with any other appropriate foreground application executed by communications device 110.

Communications device 110 may, in some aspects, generate contextual query data that includes portions of the generated audio data, which includes the captured utterance spoken by the user, and portions of the obtained contextual data, which characterizes the user's current interaction with the calendar application (e.g., in step 410). For example, and as described above, the VSP application may receive the portions of the generated audio data and the obtained contextual data through the programmatic interface, and may package the portions of the audio and contextual data into the corresponding contextual query data. In certain aspects, communications device 110 may perform operations that transmit the contextual query data to a cloud-based computing system maintained by the voice-service provider, e.g., computing system 130, across any of the communications networks described above (e.g., in step 412). As described below in reference to FIG. 5, computing system 130 may receive the contextual query data, may extract the packaged portions of audio data 122D and contextual data 122E, and may perform operations that determine a content and an application-specific intent of the user, as expressed through the spoken utterance.

Figure 5:
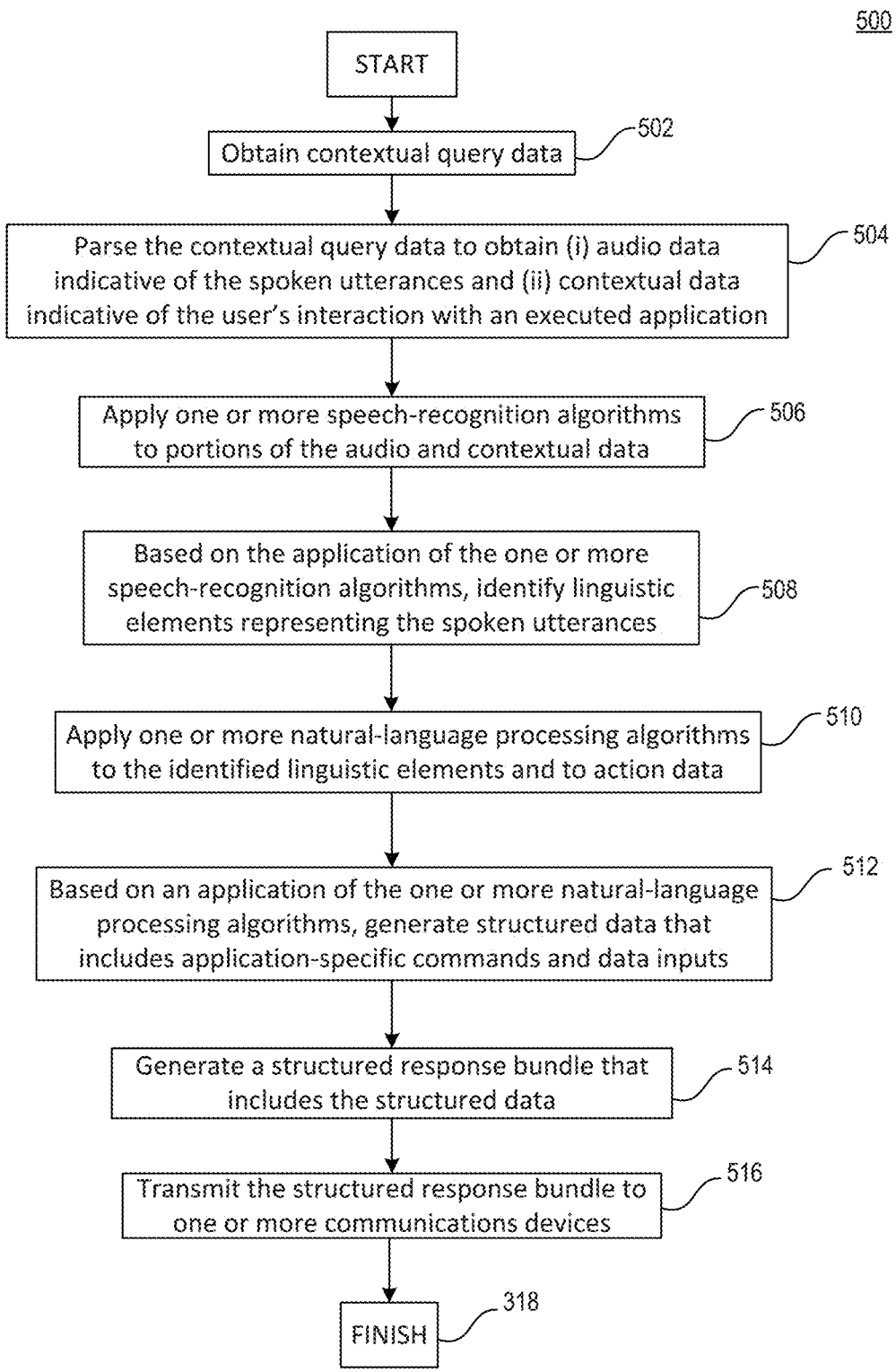

FIG. 5 is a flowchart of an exemplary process 500 for determining a content and an application-specific intent associated with a spoken utterance, in accordance with certain exemplary implementations. In some aspects, a computing system (e.g., computing system 130) may perform the steps of exemplary process 500, which may enable computing system 130 to determine a content and an application-specific of a spoken utterance based on an application of one or more of a speech-recognition algorithm, a natural-language processing algorithm, and a semantic parsing algorithm to the extracted portions of audio data and contextual data.

As described above, a communications device, such as communications device 110, may execute a particular application, such as a calendar application, and may present a native GUI associated with the application to a user through a corresponding display unit, such as a pressure-sensitive touchscreen display. In certain instances, the native GUI may include an embedded microphone icon, which the user may select to initiate voice-based interaction and control of the calendar application, and to activate a microphone included within communications device 110. The activated microphone may capture one or more application-specific utterances spoken by the user, and communications device 110 may generate audio data that includes the one or more captured utterances. Further, and based on the generated audio data and contextual data indicative of the user's current interaction with the calendar application, communications device 110 may generate contextual query and transmit portions of the contextual query data to computing system 130, which may perform operations that determine a content and an application-specific meaning, as expressed by the one or more spoken utterances.

For example, computing system 130 may receive the contextual query data communications device 110 (e.g., in step 502), and may parse the contextual query data to extract (i) audio data that includes the one or more spoken utterances and (ii) contextual data that characterizes the user's current interaction with the calendar application (e.g., in step 504). In some aspects, computing system 130 may apply one or more speech recognition algorithms to the extracted audio data (e.g., in step 506). The one or more speech-recognition algorithms may include, but are not limited to, a hidden Markov model, a dynamic time-warping-based algorithm, and one or more neural networks.

Based on the application of the one or more speech recognition algorithms, computing system 130 may generate output including one or more linguistic elements, such as words and phrases, that represent the one or more spoken utterances (e.g., in step 508). In some instances, however, the application of the one or more speech recognition algorithms to the extracted audio may identify multiple linguistic elements that could represent portions of the one or more spoken utterance with various degrees of confidence or certainty. In an effort to increase an accuracy of the applied speech recognition algorithms in steps 506 and 508, computing system 130 may, in certain aspects, access the extracted contextual data and bias the output of the one or more speech recognition algorithms toward linguistic elements that are contextually relevant to the current interaction of the user with the calendar application.

For example, due to the presence of background noise within the extracted audio data, computing system 132 may be unable to clearly recognize the word "move" within the one or more spoken utterances, and may generate output that identifies the words "prove," "move," and "groove." Based on portions of the extracted contextual data that identify the user's current interaction with the calendar application, computing system 130 may bias the generated output towards the word "move," which is consistent and relevant to the user's current interaction with the calendar application. In certain aspects, the biasing of the output of the one or more applied speech recognition algorithms towards linguistic elements that are contextually relevant to the user's current interaction with the calendar application may improve the accuracy of not only the applied speech recognition algorithms, but also the natural language processing and semantic parsing algorithms that rely on the output data, as described below.

In additional aspects, computing system 130 may apply one or more natural language processing algorithms to the one or more linguistic elements that represent the utterances spoken by the user (e.g., in step 510). Based on the application of the natural language processing algorithms to the one or more linguistic elements, computing system 130 may assign an application-specific intent to the one or more spoken utterances, and further, may generate structured data including commands and data inputs that, when passed to the calendar application, would cause the calendar application to perform operations consistent with the established application-specific meaning expressed by the one or more spoken utterances (e.g., in step 512).

For example, the natural language processing algorithms may include one or more semantic parsing algorithms and additionally or alternatively, one or more speech biasing techniques. In certain aspects, and using any of the processes described above, computing system 130 may apply the one or more semantic parsing algorithms and speech biasing techniques to (i) the output data, which identifies the linguistic elements that represent the one or more spoken utterance, and (ii) action data, which correlates representative text strings with particular actions performable by the calendar application (e.g., as a part of step 510). Based on the application of these algorithms and techniques, computing system 130 may establish not only an application-specific meaning of the one or more spoken utterances, but also a structured format of commands and data inputs that, when processed by the calendar application, cause the calendar application to perform operations consistent with the application-specific intent (e.g., as part of step 512), as described above.

In certain aspects, computing system 130 may generate a structured response bundle that identifies the action associated with the one or more spoken utterances, a corresponding event within the calendar application, current event parameters, and the modified event parameters (e.g., in step 514). As described above, the structured response bundle may be formatted in accordance with a structured command format associated with the identified action, and in some aspects, the calendar application executed by communications device 110 may process portions of the structured response bundle and perform operations consistent with the determined intent of the one or more spoken utterances.

In step 516, computing system 130 may perform operations that transmit the structured response bundle to one or more destination devices across any of the communications network described above. In one instance, computing system 120 may establish, as a destination device, that device that generated and transmitted the contextual query data to computing system 130, e.g., communications device 110. In other instances, and using any of the example processes described above, computing system 130 may identify any additional or alternate destination device based on a correspondence between portions of the structured response bundle (e.g., the identified action, the calendar application, the current or modified event parameters, an identity of user 101, etc.) and portions of stored device and/or configuration data. Exemplary process 500 may then be complete in step 518.

Referring back to FIG. 4, communications device 110 may receive the structured response bundle from computing system 130 (e.g., in step 414). For example, and as described above, the structured response bundle may include data instructing the calendar application to perform one or more actions, which may be consistent with the determined meaning, as expressed by the one or more spoken utterances. In some instances, the spoken response bundle may be formatted in accordance with a command format associated with the one or more actions, and may include, but is not limited to, data identifying the one or more actions, the calendar event associated with the actions, and current and modified event parameters, which may facilitate a performance of the one or more actions by the calendar application. Additionally, in certain aspects, the VSP application may receive the structured response bundle, and may provide portions of the structured response bundle to the calendar application through the corresponding programmatic interface.

In some aspects, communications device 110 may perform one or more operations that are consistent with the structured responding bundle and as such, the meaning expressed by the one or more spoken utterances (e.g., in step 416). For example, the executed calendar application may receive the portions of the structured response bundle through the programmatic interface, and may process the portions of the structured response bundle to perform the one or more actions consistent with the user's application-specific intent. For example, the one or more operations may include, but are not limited to, operations that establish a new appointment, cancel an existing appointment, modify parameters of an existing appointment, or response to a calendar-specific query (e.g., "When is my next appointment?"). In some aspects, and in step 416, communications device 110 may store data indicative of an outcome of the one or more performed actions in a locally accessible data repository (e.g., data repository 117), and may perform operations that modify or update portions of the native GUI, as presented through the corresponding display unit, to reflect the outcome of the performance of the one or more actions.

Additionally, communications device 110 may determine whether the structured response bundle includes any audible content suitable for presentation as a follow-up to the user's spoken utterances (e.g., in step 418). For example, and as described above, computing system 130 may determine that the user's spoken utterances correspond to a specific action that may be performed by the calendar application, such as a request to modify the event parameters of an existing appointment, but that these utterances fail to include one or more modified event parameters necessary to complete the modification of the existing appointment, such as a modified start time or event location. In some aspects, the structured response bundle may include pre-recorded audio content, such as text-to-speech (TTS) content generated by computing system 130 (or any additional or alternate system in communication with computing system 130), that may be presented to the user through a corresponding audio interface, such as a speaker, and which prompts the user to provide the information necessary to complete the one or more actions.

For example, if communications device 110 were to detect additional audible content within the structured response bundle (e.g., step 418; YES), communications device 110 may initiate a voice-based dialog with the user, and may present the additional audible content to the user through the speaker as a follow-up to the one or more spoken utterances (e.g., in step 420). Exemplary process 400 may then pass back to step 406, and the microphone included within communications device 110 may capture additional utterances spoken by the user in response to the presented audio content. Alternatively, if communications device 110 were to detect no additional audible content within the structured response bundle (e.g., step 418; NO), communications device 110 may deactivate the microphone using any of the processes described above (e.g., in step 422). Exemplary process 400 may then be complete in step 424.

In certain implementations described above, a computing system maintained by a voice-service provider, e.g., computing system 130, performs operations that apply speech-recognition algorithms to the captured audio data and obtained contextual data to determine one or more linguistic elements that represent one or more spoken utterances and further, may apply one or more natural-language processing and semantic parsing algorithms to the linguistic elements to establish an application-specific intent of the utterances and to generate structured data that, when processed by an executed application, cause the executed application to perform operations consistent with the user's application-specific intent. In other implementations, communications device 110 may implement a speech recognition module (e.g., similar to speech recognition module 132 described above), which may directly apply the one or more speech-recognition algorithms to portions of the captured audio data and obtained contextual data to determine the one or more linguistic elements that represent the user's spoken utterances without computing system 130. Additionally or alternatively, communications device 110 may also implement a natural language processing module and/or a semantic parsing module (e.g., similar to natural language processing module 134 and semantic parsing module 134A described above), which may directly apply the one or more natural-language processing and semantic parsing algorithms to the linguistic elements to establish the application-specific intent of the user's spoken utterances, and further, to generate the structured data without recourse to computing system 130.

Figure 6:
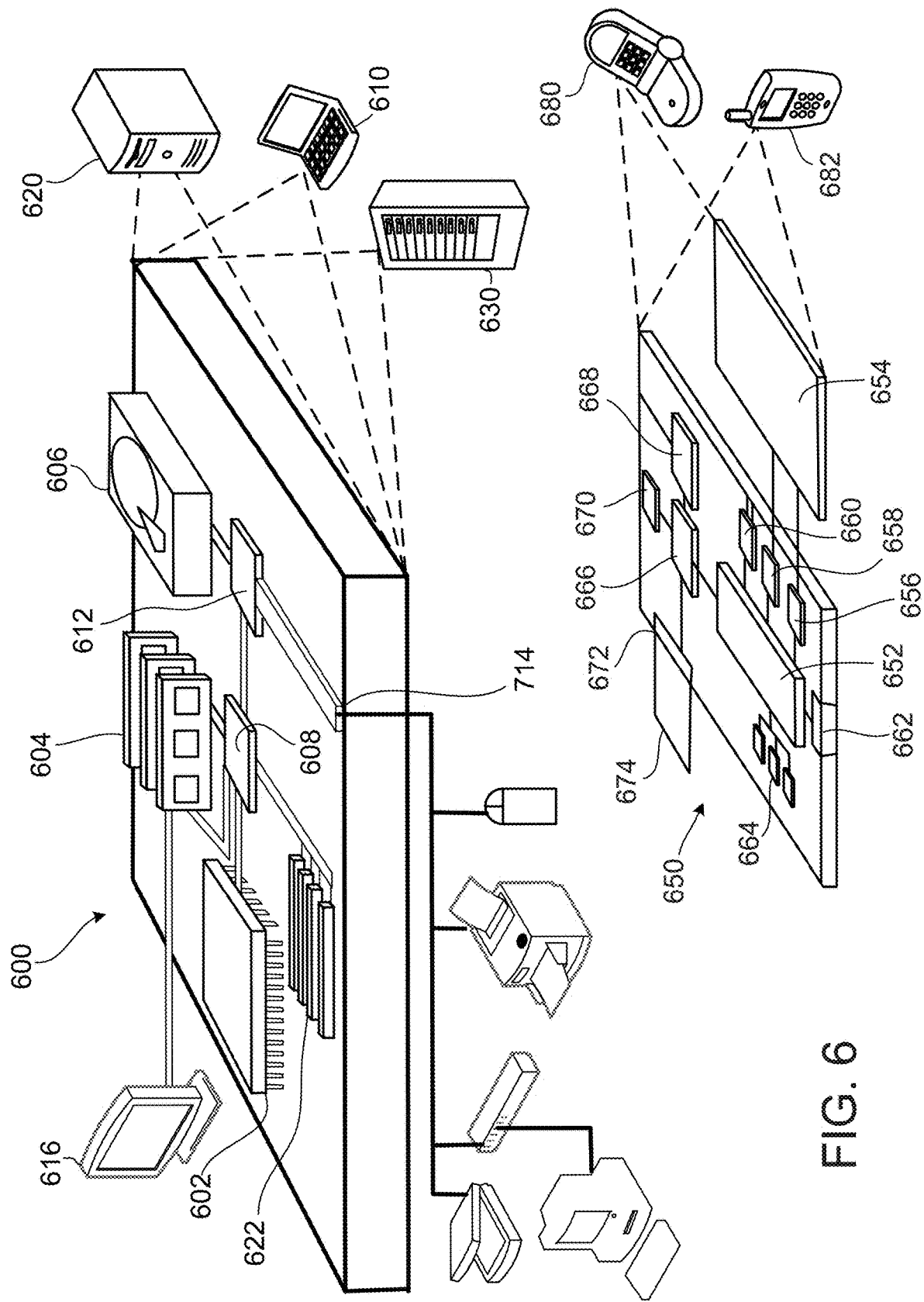
FIG. 6 is a diagram of computing devices that may be used to implement the systems and methods described in this document, as either a client or as a server or plurality of server.

FIG. 6 is a block diagram of computing devices 600 and 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers (e.g., computing system 130 of FIG. 1). Computing device 650 is intended to represent various forms of mobile devices, such as personal digital assistants, cellular telephones, smartphones, and other similar computing devices (e.g., communications device 110 of FIG. 1). Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, microphone/speaker pair, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 602 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method, comprising:
receiving, by a computing device and with a first client application installed on the computing device, an utterance that was spoken by a user of the computing device;
processing the utterance with the computing device to generate a voice query, the voice query including data that is based on the utterance;
transmitting the voice query from the computing device to a remote computing system corresponding to a voice service provider application installed on the computing device, wherein the voice service provider application is separate from the first client application;
obtaining, by the computing device and from the remote computing system associated with the voice service provider application, a response to the voice query;
selecting, by the first client application, a user interface element from a library of user interface elements associated with the voice service provider application; and
presenting the response to the voice query at the computing device,
wherein the user interface element from the library associated with the voice service provider is embedded into a native user interface of the first client application,
wherein the library associated with the voice service provider application comprises a library of application-neutral elements of executable code that, when executed, embed user interface elements into native user interfaces of a plurality of applications executed by the computing device, and
wherein the embedded user interface elements are selectable to initiate, by the voice service provider application, voice-based interactions with the native user interfaces of the plurality of applications executed by the computing device.

2. The computer-implemented method of claim 1, wherein the response to the voice query comprises a structured data set that specifies values for a plurality of query-response parameters.

3. The computer-implemented method of claim 2, wherein presenting the response to the voice query at the computing device further comprises:
parsing the structured data set of the response to the voice query to extract values for at least a portion of the plurality of query-response parameters; and
populating the user interface element with extracted values for the at least the portion of the plurality of query-response parameters.

4. The computer-implemented method of claim 1, wherein selecting the user interface element from the library associated with the voice service provider application comprises selecting the user interface element from a plurality of user interface elements based on the selected user interface element corresponding to a type of inquiry provided by the utterance.

5. The computer-implemented method of claim 4, wherein the plurality of user interface elements include at least one user interface element that is formatted to present responses to at least one of a generic inquiry, a weather inquiry, or a current events inquiry.

6. The computer-implemented method of claim 1, wherein presenting the response to the voice query includes determining, by the computing device, a position in which to display the user interface element from the library associated with the voice service provider within the native user interface of the first client application.

7. The computer-implemented method of claim 1, wherein presenting the response to the voice query includes configuring the user interface element from the library associated with the voice service provider as an overlay that obscures a portion of the native user interface of the first client application, a slide-up card or slide-down card that translates into or out of the native user interface of the first client application along a longitudinal axis, or a drawer card that translates into or out of the native user interface of the first client application along a transverse axis.

8. The computer-implemented method of claim 1, wherein obtaining the response to the voice query includes obtaining (i) a speech component of the response to the voice query and (ii) a visual component of the response to the voice query,
wherein presenting the response to the voice query at the computing device comprises playing the speech component of the response to the voice query and displaying the visual component of the response to the voice query.

9. The computer-implemented method of claim 1, wherein the response to the voice query includes weather information.

10. The computer-implemented method of claim 1, wherein a developer of the first client application is independent of the remote service provider.

11. One or more non-transitory computer-readable media having instructions stored thereon that, when executed by data processing apparatus of a computing device, cause the data processing apparatus to perform operations comprising:
receiving, by the computing device and with a first client application installed on the computing device, an utterance that was spoken by a user of the computing device;
processing the utterance with the computing device to generate a voice query, the voice query including data that is based on the utterance;
transmitting the voice query from the computing device to a remote computing system associated with a voice service provider application installed on the computing device, wherein the voice service provider application is separate from the first client application;
obtaining, by the computing device and from the remote computing system associated with the voice service provider application, a response to the voice query;

selecting, by the first client application, a user interface element from a library of user interface elements associated with the voice service provider application; and presenting the response to the voice query at the computing device, wherein the user interface element from the library associated with the voice service provider is embedded into a native user interface of the first client application, wherein the library associated with the voice service provider application comprises a library of application-neutral elements of executable code that, when executed, embed user interface elements into native user interfaces of a plurality of applications executed by the computing device, and wherein the embedded user interface elements are selectable to initiate, by the voice service provider application, voice-based interactions with the native user interfaces of the plurality of applications executed by the computing device.

12. The one or more non-transitory computer-readable media of claim 11, wherein the response to the voice query comprises a structured data set that specifies values for a plurality of query-response parameters.

13. The one or more non-transitory computer-readable media of claim 12, wherein presenting the response to the voice query at the computing device further comprises:

parsing the structured data set of the response to the voice query to extract values for at least a portion of the plurality of query-response parameters; and populating the user interface element with extracted values for the at least the portion of the plurality of query-response parameters.

14. The one or more non-transitory computer-readable media of claim 11, wherein selecting the user interface element from the library associated with the voice service provider application comprises selecting the user interface element from a plurality of user interface elements based on the selected user interface element corresponding to a type of inquiry provided by the utterance.

15. The one or more non-transitory computer-readable media of claim 14, wherein the plurality of user interface elements include at least one user interface element that is formatted to present responses to at least one of a generic inquiry, a weather inquiry, or a current events inquiry.

16. The one or more non-transitory computer-readable media of claim 11, wherein presenting the response to the voice query includes determining, by the computing device, a position in which to display the user interface element from the library associated with the voice service provider within the native user interface of the first client application.

17. The one or more non-transitory computer-readable media of claim 11, wherein presenting the response to the voice query includes configuring the user interface element from the library associated with the voice service provider as an overlay that obscures a portion of the native user interface of the first client application, a slide-up card or slide-down card that translates into or out of the native user interface of the first client application along a longitudinal axis, or a drawer card that translates into or out of the native user interface of the first client application along a transverse axis.

18. The one or more non-transitory computer-readable media of claim 11, wherein obtaining the response to the voice query includes obtaining (i) a speech component of the response to the voice query and (ii) a visual component of the response to the voice query, wherein presenting the response to the voice query at the computing device comprises playing the speech component of the response to the voice query and displaying the visual component of the response to the voice query.

19. The one or more non-transitory computer-readable media of claim 11, wherein the response to the voice query includes weather information.

20. The one or more non-transitory computer-readable media of claim 11, wherein a developer of the first client application is independent of the remote service provider.

* * * * *